US012325663B2

(12) United States Patent
Bordin et al.

(10) Patent No.: US 12,325,663 B2
(45) Date of Patent: Jun. 10, 2025

(54) FIBER CEMENT DECKING PRODUCTS AND METHODS FOR THE PRODUCTION THEREOF

(71) Applicants: ETEX SERVICES NV, Kapelle-op-den-Bos (BE); ETERNIT NV, Kapelle-op-den-Bos (BE)

(72) Inventors: Ruben Bordin, Mechelen (BE); Maarten Milis, Merchtem (BE); Philippe Hellemans, Kapelle-op-den-Bos (BE)

(73) Assignees: ETEX SERVICES, N.V., Kapelle-op-den-Bos (BE); ETERNIT NV, Kapelle-op-den-Bos (BE)

( * ) Notice: Subject to any disclaimer, the term of this patent is extended or adjusted under 35 U.S.C. 154(b) by 1491 days.

(21) Appl. No.: 16/474,723

(22) PCT Filed: Jan. 26, 2018

(86) PCT No.: PCT/EP2018/051964
§ 371 (c)(1),
(2) Date: Jun. 28, 2019

(87) PCT Pub. No.: WO2018/138266
PCT Pub. Date: Aug. 2, 2018

(65) Prior Publication Data
US 2019/0330107 A1    Oct. 31, 2019

(30) Foreign Application Priority Data
Jan. 26, 2017   (EP) .................................... 17153233
Sep. 22, 2017   (EP) .................................... 17192726

(51) Int. Cl.
*C04B 14/00*   (2006.01)
*C04B 14/04*   (2006.01)
(Continued)

(52) U.S. Cl.
CPC ........ *C04B 16/0641* (2013.01); *C04B 14/043* (2013.01); *C04B 14/062* (2013.01);
(Continued)

(58) Field of Classification Search
CPC . C04B 16/0641; C04B 14/043; C04B 14/062; C04B 14/106; C04B 14/18;
(Continued)

(56) References Cited

U.S. PATENT DOCUMENTS

2004/0083677 A1   5/2004  Bezubic et al.
2008/0141908 A1*  6/2008  Peng ...................... C04B 28/02
                                                          106/713
(Continued)

FOREIGN PATENT DOCUMENTS

AR         23809 A1    9/2002
CL    2012000688 A1    6/2022
(Continued)

*Primary Examiner* — James E McDonough
(74) *Attorney, Agent, or Firm* — Dilworth & Barrese, LLP; Michael J. Musella, Esq.

(57) ABSTRACT

The present invention relates to fiber cement decking products, which comprise at least one or more pigments and which are at least partly coloured in the mass. The present invention further relates to methods for the production of such fiber cement decking products as well as uses of such fiber cement decking products in the building industry. The present invention further relates to fiber cement formulations and fiber cement materials, which are suitable for the production of fiber cement products for decking applications.

9 Claims, 8 Drawing Sheets

(51) Int. Cl.

| | | |
|---|---|---|
| *C04B 14/06* | (2006.01) | |
| *C04B 14/10* | (2006.01) | |
| *C04B 14/18* | (2006.01) | |
| *C04B 14/20* | (2006.01) | |
| *C04B 16/06* | (2006.01) | |
| *C04B 28/02* | (2006.01) | |
| *C04B 28/04* | (2006.01) | |
| *C04B 40/00* | (2006.01) | |
| *E04C 2/06* | (2006.01) | |
| *E04F 15/10* | (2006.01) | |
| *C04B 103/54* | (2006.01) | |
| *C04B 111/00* | (2006.01) | |
| *C04B 111/27* | (2006.01) | |
| *C04B 111/60* | (2006.01) | |
| *C04B 111/82* | (2006.01) | |

(52) U.S. Cl.
CPC ............ *C04B 14/106* (2013.01); *C04B 14/18* (2013.01); *C04B 14/20* (2013.01); *C04B 16/0633* (2013.01); *C04B 28/02* (2013.01); *C04B 28/04* (2013.01); *C04B 40/0064* (2013.01); *E04C 2/06* (2013.01); *E04F 15/10* (2013.01); *C04B 2103/54* (2013.01); *C04B 2111/00405* (2013.01); *C04B 2111/27* (2013.01); *C04B 2111/60* (2013.01); *C04B 2111/82* (2013.01)

(58) Field of Classification Search
CPC ..... C04B 14/20; C04B 16/0633; C04B 28/02; C04B 28/04; C04B 40/0064; C04B 2111/00405; C04B 2111/60; C04B 2111/82; C04B 7/34; C04B 7/00; C04B 28/00; C04B 32/00; C04B 14/00; C04B 16/00; C04B 24/00; C04B 9/12

USPC .......................................... 106/638, 712, 713
See application file for complete search history.

(56) References Cited

U.S. PATENT DOCUMENTS

| | | | | |
|---|---|---|---|---|
| 2009/0162602 | A1* | 6/2009 | Cottier | .................... C04B 28/02 |
| | | | | 428/411.1 |
| 2010/0162926 | A1* | 7/2010 | Thomson | ................ C04B 28/02 |
| | | | | 977/775 |
| 2021/0292234 | A1 | 7/2021 | Endl | |

FOREIGN PATENT DOCUMENTS

| | | | |
|---|---|---|---|
| CN | 101528640 | | 9/2009 |
| EP | 0305209 | A1 | 3/1989 |
| EP | 1047647 | B1 | 3/2004 |
| EP | 2172434 | A1 | 4/2010 |
| EP | 1044939 | B1 | 8/2011 |
| EP | 3112330 | A1 | 6/2015 |
| EP | 3075715 | A1 * | 10/2016 |
| GB | 2164329 | A | 3/1986 |
| RU | 2486150 | C1 | 6/2013 |
| TH | 0901000520 | A | 2/2009 |
| WO | 2002081399 | A1 | 10/2002 |
| WO | 2004/033770 | A1 | 4/2004 |
| WO | 2007/128679 | A1 | 11/2007 |
| WO | 2008046803 | A1 | 4/2008 |
| WO | 2010037628 | A1 | 8/2010 |
| WO | 2017001236 | A1 | 1/2017 |
| WO | 2018/011423 | A1 | 1/2018 |
| WO | 2019/038260 | A1 | 2/2019 |

\* cited by examiner

FIBER CEMENT DECKING PRODUCTS AND METHODS FOR THE PRODUCTION THEREOF

FIELD OF THE INVENTION

The present invention relates to fiber cement decking products. The present invention further relates to methods for the production of such fiber cement decking products as well as uses of such fiber cement decking products in the building industry. The present invention further relates to fiber cement formulations and fiber cement materials, which are suitable for the production of fiber cement products for decking applications.

BACKGROUND OF THE INVENTION

Decking products are generally known in the art. However, in the past various problems and difficulties have been encountered in providing suitably structured all-weather decking surfaces, which are both able to withstand (heavy) pedestrian traffic and are esthetically pleasing.

To this end, different types of materials and surfaces have been tried out with variable success, the most commonly used surface materials being wood, wood-plastic composite and concrete.

These materials, however, possess inherent disadvantages.

Wooden surfaces have the inherent problems of moss and fungi growth, rotting, splitting, splintering and termite damage. Wood therefore needs to be treated regularly and still has a relatively limited life-time of about 15 years. Moreover, the higher quality wood types used for decking applications are tropical wood species originating from the rain forest and thus do not provide an eco-friendly solution. Wood-plastic composite surfaces also suffer from moss and fungi growth and the polymer component is vulnerable to UV degradation. Concrete, on the other hand, has an inherent tendency to crack when subjected to adverse and variable weather conditions and humidity.

SUMMARY OF THE INVENTION

The object of the present invention is to provide an esthetically appealing, strong and resilient decking product that overcomes the above-mentioned problems.

The inventors have found a solution to the above-mentioned problems by developing decking products comprising a novel and inventive fiber cement matrix as the core material. Mass-coloured fiber cement products are generally known in the art, for example from EP3112330. However, up to now it has not been feasible to develop a fiber cement decking product, which has both an elegant appearance and which is mechanically strong enough and resistant enough to cracks and wearing, even under harsh and adverse weather conditions and heavy pedestrian traffic. In particular, the fiber cement products as designed by the present inventors and as disclosed herein are esthetically appealing because of their mass-coloured feature, whereby the surface of these products displays (at least part of) the inner texture and colour of the core materials, providing the products with a natural yet modern look. Mass-colouration of the products furthermore provides the additional advantage that any damage that may occur during the life-time of the products will be less visible compared to coated products, which are typically not coloured in the mass.

In addition, the fiber cement decking products of the present invention have improved technical characteristics, for example with regard to mechanical performance, impact resistance, dimensional stability, resistance against humidity, freeze-thaw resistance etc. when compared to the known fiber cement products. As will become clear from the Examples herein, these different improved characteristics are the result of different technical features comprised in the fiber cement matrix of the products of the present invention and/or comprised in the steps of the process for producing these. As a consequence, thanks to their improved mechanical and physical properties, the fiber cement products of the present invention are particularly suitable for decking purposes; as opposed to the standard fiber cement products known in the art, such as for example the known fiber cement sheets disclosed in EP3112330.

According to a first aspect, the present invention provides fiber cement decking products, wherein the fiber cement products are coloured in the mass (as further defined herein).

In particular embodiments, the mass-coloured fiber cement decking products of the present invention are air-cured fiber cement decking products.

In particular embodiments, the mass-coloured fiber cement decking products of the present invention comprise a combination of at least two different types of synthetic fibers.

In further particular embodiments, the mass-coloured fiber cement decking products of the present invention comprise a combination of at least two different types of synthetic fibers, wherein the at least two different types of synthetic fibers are polypropylene fibers and polyvinyl alcohol fibers. In still further particular embodiments, the mass-coloured fiber cement decking products of the present invention at least comprise polypropylene fibers in an amount of about 0.1 weight % to about 1 weight % (weight % compared to the total dry weight of the fiber cement composition) and polyvinyl alcohol fibers in an amount of about 0.1 weight % to about 3 weight % (weight % compared to the total dry weight of the fiber cement composition). In yet further particular embodiments, the mass-coloured fiber cement decking products of the present invention at least comprise a combination of polypropylene fibers in an amount of about 0.5 weight % (weight % compared to the total dry weight of the fiber cement composition) and polyvinyl alcohol fibers in an amount of about 2 weight % (weight % compared to the total dry weight of the fiber cement composition).

In yet further particular embodiments, the mass-coloured fiber cement decking products of the present invention comprise a combination of polypropylene fibers in an amount of about 0.5 weight % (weight % compared to the total dry weight of the fiber cement composition), polyvinyl alcohol fibers with a thickness of about 7 dtex in an amount of about 1 weight % (weight % compared to the total dry weight of the fiber cement composition) and polyvinyl alcohol fibers with a thickness of about 2 dtex in an amount of about 1 weight % (weight % compared to the total dry weight of the fiber cement composition).

In yet further particular embodiments, the mass-coloured fiber cement decking products of the present invention comprise a combination of polypropylene fibers in an amount of about 0.5 weight % (weight % compared to the total dry weight of the fiber cement composition), polyvinyl alcohol fibers with a thickness of about 7 dtex in an amount of about 1.5 weight % (weight % compared to the total dry weight of the fiber cement composition) and polyvinyl alcohol fibers with a thickness of about 4 dtex in an amount of about 1 weight % (weight % compared to the total dry weight of the fiber cement composition).

In still further particular embodiments, the mass-coloured fiber cement decking products of the present invention comprise a combination of polypropylene fibers in an amount of about 0.5 weight % (weight % compared to the total dry weight of the fiber cement composition) and polyvinyl alcohol fibers with a thickness of about 4 dtex in an amount of about 1 weight % (weight % compared to the total dry weight of the fiber cement composition).

In particular embodiments, the mass-coloured fiber cement decking products of the present invention comprise amorphous silica. In further particular embodiments, the mass-coloured fiber cement decking products of the present invention comprise amorphous silica in an amount of about 2 weight % to about 10 weight %, more particularly in an amount of about 4 weight % to about 9 weight %, most particularly in an amount of about 4 weight % to about 7 weight %, such as in an amount of about 7 weight % (weight % compared to the total dry weight of the fiber cement composition).

In particular embodiments, the mass-coloured fiber cement decking products of the present invention comprise one or more pigments. In further particular embodiments, the mass-coloured fiber cement decking products of the present invention comprise one or more pigments in an amount of about 2 weight % to about 15 weight %, particularly in an amount of about 3 weight % to about 10 weight %, more particularly in an amount of about 3 weight % to about 9 weight %, most particularly in an amount of about 3 weight % to about 5 weight %, such as in an amount of about 4 weight % (weight % compared to the total dry weight of the fiber cement composition).

In further particular embodiments, the mass-coloured fiber cement decking products of the present invention are completely coloured in the mass (i.e. throughout their entire structure).

In alternative particular embodiments, the mass-coloured fiber cement decking products of the present invention, are partially coloured in the mass, such as for instance but not limited to partially mass-coloured in one or more upper layers of the fiber cement product, such as in one or more upper Hatschek layers of the fiber cement product, such as mass-coloured in the 5 to 50, more particularly the 5 to 40, most particularly the 5 to 30 most upper Hatschek layers of the fiber cement product. In these particular embodiments, the mass-coloured fiber cement decking products of the present invention, are partially coloured in the mass, such as for instance but not limited to partially mass-coloured throughout an entire top surface layer, having a thickness between about 1 mm to about 10 mm, such as between about 1 mm to about 3 mm.

In particular embodiments, the mass-coloured fiber cement decking products of the present invention are non-uniformly mass-coloured, thereby providing the product with a cloudy, marble-like coloured pattern and variants thereof.

In particular embodiments, the mass-coloured fiber cement decking products of the present invention are surface-treated. In further particular embodiments, the mass-coloured fiber cement decking product is abrasively blasted (as further described herein). In other certain particular embodiments, the mass-coloured fiber cement decking product has an engraved surface pattern (as further described herein). In other certain particular embodiments, the mass-coloured fiber cement decking product has an embossed surface pattern (as further described herein).

In particular embodiments, the mass-coloured fiber cement decking products of the present invention, the fiber cement decking products are fiber cement decking planks. In alternative particular embodiments, the mass-coloured fiber cement decking products of the present invention, the fiber cement decking products are fiber cement decking tiles.

In a second aspect, the present invention provides methods for the manufacture of mass-coloured fiber cement decking products, at least comprising the steps of:
(i) Providing a fiber cement slurry;
(ii) Manufacturing a fiber cement decking product by means of a fiber cement production process;
(iii) Curing the fiber cement decking product,
wherein said methods are characterized in that one or more pigments are added to said fiber cement product during step (i) and/or step (ii).

In particular embodiments, the present invention provides methods for the manufacture of mass-coloured fiber cement decking products, wherein step (ii) of manufacturing a fiber cement decking product is performed by means of a fiber cement production process chosen from the group consisting of a Hatschek process, a Magnani process, an extrusion process and a flow-on method. In further particular embodiments, the present invention provides methods for the manufacture of mass-coloured fiber cement decking products, wherein step (ii) of manufacturing a fiber cement decking product is performed by means of a Hatschek production process.

In particular embodiments, the present invention provides methods for the manufacture of mass-coloured fiber cement decking products, wherein one or more pigments are added in the fiber cement slurry during step (i) of providing a fiber cement slurry.

In particular embodiments, the present invention provides methods for the manufacture of mass-coloured fiber cement decking products, wherein step (ii) of manufacturing a fiber cement decking product is performed by means of a Hatschek production process and the one or more pigments are added by means of a separate pigment slurry feed, which separate pigment slurry feed is installed on the Hatschek production line.

In a third aspect, the present invention provides mass-coloured fiber cement decking products obtainable by any of the methods as disclosed by the present invention.

In a fourth aspect, the present invention provides uses of mass-coloured fiber cement decking products as disclosed herein as building materials, in particular for decking applications, fencing applications and/or covering applications.

The independent and dependent claims set out particular and preferred features of the invention.

Features from the dependent claims may be combined with features of the independent or other dependent claims, and/or with features set out in the description above and/or hereinafter as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
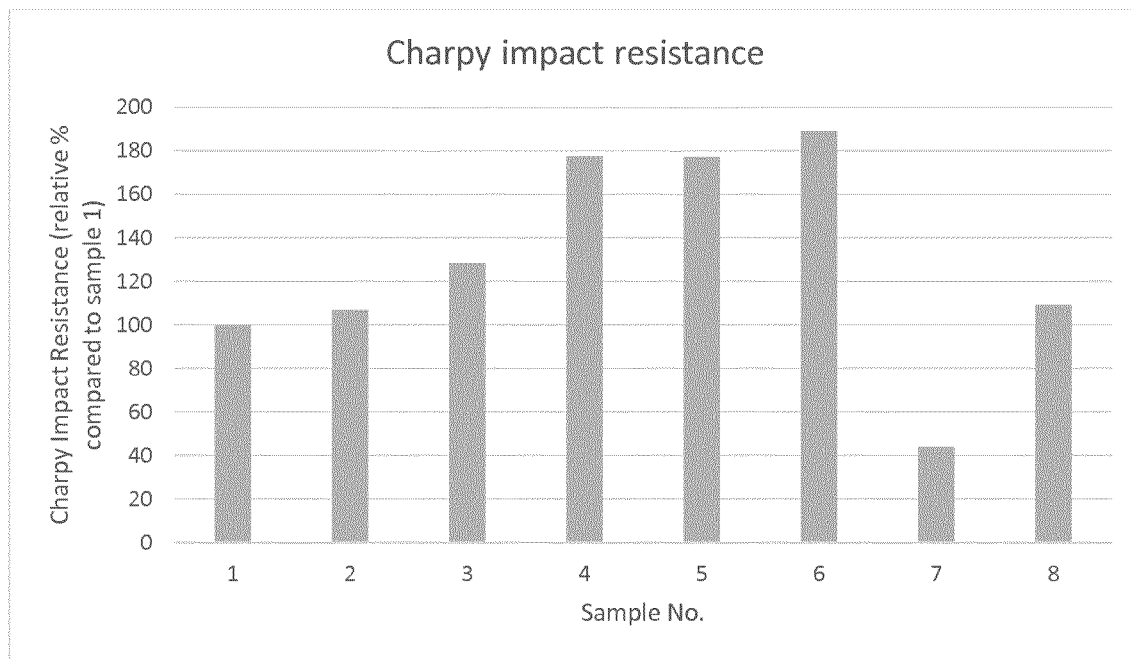
FIG. 1 shows a graph of the Charpy impact resistance (in relative % compared to Sample 1) of fiber cement samples 1 to 8 as produced with the compositions represented in Table 1. Charpy impact resistance was measured 29 days after production and air-curing (samples 1 to 6 and 8) or autoclave-curing (sample 7).

The same reference signs refer to the same, similar or analogous elements in the different figures.

DETAILED DESCRIPTION OF THE INVENTION

It is to be noted that the term "comprising", used in the claims, should not be interpreted as being restricted to the means listed thereafter; it does not exclude other elements or steps. It is thus to be interpreted as specifying the presence of the stated features, steps or components as referred to, but does not preclude the presence or addition of one or more other features, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art.

The following terms are provided solely to aid in the understanding of the invention.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The recitation of numerical ranges by endpoints includes all numbers and fractions subsumed within the respective ranges, as well as the recited endpoints.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

The terms "(fiber) cementitious slurry" or "(fiber) cement slurry" as referred to herein generally refer to slurries at least comprising water, fibers and cement. The fiber cement slurry as used in the context of the present invention may also further comprise other components, such as but not limited to, limestone, chalk, quick lime, slaked or hydrated lime, ground sand, silica sand flour, quartz flour, amorphous silica, condensed silica fume, microsilica, metakaolin, wollastonite, mica, perlite, vermiculite, aluminum hydroxide, pigments, anti-foaming agents, flocculants, and other additives.

"Fiber(s)" present in the fiber cement slurry as described herein may be for example process fibers and/or reinforcing fibers which both may be organic fibers (typically cellulose fibers) or synthetic fibers (polyvinyl alcohol, polyacrylonitrile, polypropylene, polyamide, polyester, polycarbonate, etc.).

"Cement" present in the fiber cement slurry as described herein may be for example but is not limited to Portland cement, cement with high alumina content, Portland cement of iron, trass-cement, slag cement, plaster, calcium silicates formed by autoclave treatment and combinations of particular binders. In more particular embodiments, cement in the products of the invention is Portland cement.

The terms "predetermined" and "predefined" as used herein when referring to one or more parameters or properties generally mean that the desired value(s) of these parameters or properties have been determined or defined beforehand, i.e. prior to the start of the process for producing the products that are characterized by one or more of these parameters or properties.

The term "cementitious" as in "cementitious product" or "cementitious material" as used herein refers to any product or material comprising cement, such as but not limited to Portland cement, cement with high alumina content, Portland cement of iron, trass-cement, slag cement, plaster, calcium silicates formed by autoclave treatment and combinations of particular binders. In more particular embodiments, cement in the products of the invention is Portland cement.

The terms "fiber cement product" and "fiber cement decking product" as used herein refer to products at least comprising fibers and cement, which products are characterized in that they are particularly suitable for outdoor use as a flooring or decking material and are resistant against harsh weather conditions and heavy pedestrian traffic. The fiber cement products as used in the context of the present invention may also further comprise other components, such as but not limited to, limestone, chalk, quick lime, slaked or hydrated lime, ground sand, silica sand flour, quartz flour, amorphous silica, condensed silica fume, microsilica, metakaolin, wollastonite, mica, perlite, vermiculite, aluminum hydroxide, pigments, anti-foaming agents, flocculants, and other additives.

A "(fiber cement) sheet" as used herein, also referred to as a panel or a plate, is to be understood as a flat, usually rectangular element, a fiber cement panel or fiber cement sheet being provided out of fiber cement material. The panel or sheet has two main faces or surfaces, being the surfaces with the largest surface area. The sheet can be used to provide an outer surface to walls, both internal as well as external a building or construction, e.g. as façade plate, siding, etc.

The term "fiber cement layer" as used herein generally, and particularly in the context of the present invention, refers to any flat, optionally substantially rectangular, layer or cake essentially consisting of a fiber cement composition and having a thickness of at least about 1 mm, in particular between about 1 mm and 200 mm, more particularly between about 2 mm and about 150 mm, most particularly between about 4 mm and about 100 mm, such as between about 8 mm and about 10 mm.

A "Hatschek fiber cement layer" or a "Hatschek layer" as interchangeably used herein refers to a fiber cement layer (as defined herein), which is produced according to a Hatschek process, which at least comprises the steps of:
(i) building a fiber cement film on a sieve, which sieve rotates so as to be in contact with a fiber cement slurry in a vat;
(ii) transferring the fiber cement film from the sieve to the felt transport belt, and
(iii) accumulating the fiber cement film on an accumulator roll via the felt transport belt.

In the context of the present invention, the use of the term "fiber cement film" refers to such a thin layer of fiber cement being applied onto the felt transport belt by one or more sieves rotating in a fiber cement slurry that is present in one or more vats of the Hatschek process. As may be understood from the aforementioned, series of thin fiber cement layers are produced on the one or more sieves from the Hatschek machine and subsequently superimposed and transferred from the one or more sieves to the transport belt, resulting in one or more uncured Hatschek fiber cement layers after accumulation on an accumulation roll. Thus, it will be clear that, when referring to "a fiber cement film" in the context of the present invention, it is to be understood that this term encompasses, where applicable, both the meaning of one single fiber cement film having a thickness of between about 0.01 mm and about 0.9 mm, such as in particular between about 0.05 mm and about 0.5 mm, such as between about 0.1 mm and about 0.4 mm, such as about 0.3 mm. (i.e. one thin layer of fiber cement also called a mono-layer, a single layer or a primary layer, that is applied onto the felt transport belt by a sieve from a vat of the Hatschek process) as well as the meaning of a layer comprising two or more superimposed fiber cement layers, each having a thickness of between about 0.01 mm and about 0.9 mm, such as in particular between about 0.05 mm and about 0.5 mm, such as between about 0.1 mm and about 0.4 mm, such as about 0.3 mm (i.e. two or more superimposed thin layers of fiber cement applied onto the felt transport belt by two or more sieves from a vat of the Hatschek process). The skilled person will understand, depending on the particular configuration of the Hatschek section, that when referring to processes of the invention in general both meanings of the term "fiber cement film" as described above will be applicable, while in more particular embodiments only one of both meanings are applicable. For instance, in a particular case where only one sieve is used in the Hatschek section for performing the processes of the invention, "a fiber cement film" as used herein means only one single layer having a thickness of between about 0.01 mm and about 0.9 mm that is applied onto the felt transport belt by the sieve from a vat of the Hatschek process. On the other hand, where two or more sieves are used in the Hatschek section for performing the processes of the invention, "a fiber cement film" as used herein means a superposition of two or more single layers, each having a thickness of between about 0.01 mm and about 0.9 mm, which are applied onto the felt transport belt by the sieve from a vat of the Hatschek process.

The term "water-permeable" as used herein when referring to a water-permeable (region of a) transport belt generally, and particularly in the context of the present invention, means that the material of which the water-permeable (region of the) belt is made allows water to flow through its structure to a certain extent.

The "water-permeability" as used herein when referring to the water-permeability of a (region of a) transport belt generally, and particularly in the context of the present invention, refers to the extent or degree to which the material of which the water-permeable (region of the) belt is made, allows water to flow through its structure. Suitable materials for water-permeable transport belts are known to the person skilled in the art, such as but not limited to felts.

A "non-hydrophobized (fiber cement) product" or a "non-hydrophobized fiber cement (film) layer" as used in the present context refers to a product, such as a fiber cement product or a fiber cement (film) layer, which has not been treated before, during or after its production, with a hydrophobizing agent. In particular, a "non-hydrophobized fiber cement product" or a "non-hydrophobized fiber cement sheet" as used herein will only comprise "fiber cement film layers", which are non-hydrophobized.

The terms "mass-coloured", "coloured in the mass", "through-coloured" when referring to a fiber cement product has the meaning that at least part of the, and preferably the entire, internal structure of that fiber cement product comprises at least one, i.e. one or more, pigment(s).

The terms "internal (fiber cement) structure", "inner (fiber cement) structure", "internal (fiber cement) mass" or "inner (fiber cement) mass" as referred to interchangeably herein are used to indicate the fiber cement material present in a fiber cement product, which material is not visible with the eye when looking at the product from the outside.

The terms "external (fiber cement) structure" or "external (fiber cement) surface" as referred to interchangeably herein are used to indicate the fiber cement material which is exposed and visible on the outside of a fiber cement product.

The recitations "mass-coloured fiber cement products" or "coloured fiber cement products" as used herein is meant to indicate fiber cement products that are coloured in the mass (as defined herein).

A "transparent pigment" as used herein is meant to indicate a pigment of which the pigment particles have the property of transmitting visible light. Thus, a "transparent pigment" as used herein is a pigment, of which the majority of pigment particles are smaller than the wave length of visible light.

An "opaque pigment" as used herein is meant to indicate a pigment of which the pigment particles do not have the property of transmitting visible light. Thus, an "opaque pigment" as used herein is a pigment of which the majority of pigment particles are greater than the wave length of visible light.

A "semi-opaque pigment" (also referred to in the art as a semi-transparent pigment) as used herein is meant to indicate a pigment of which only a certain but significant percentage of pigment particles have the property of transmitting visible light. Thus, a "semi-opaque pigment" as used herein is a pigment of which a certain but significant percentage of pigment particles are greater than the wave length of visible light and of which the remaining percentage of pigment particles are smaller than the wave length of visible light.

The term "pigment" as used herein refers to a dry insoluble substance, usually pulverized, which when suspended in a liquid vehicle becomes a paint, ink, etc. Pigments typically consist of tiny solid particles that are used to enhance the appearance by providing color and/or to improve the physical (functional) properties of the paint or ink. Pigments used to provide color generally range from 0.2 to 0.4 microns in diameter. Functional pigments are typically 2-4 microns in diameter, but they may be as large as 50 microns.

The term "prime pigment" as used herein refers to any pigment (as defined herein), which is capable of providing whiteness and/or color to a substance while also contributing significantly to the hiding power of said substance. Prime pigments can be subdivided in white pigments and color pigments.

The term "white pigment" as referred to herein means a prime pigment, capable of scattering light and providing whiteness and hiding in flat or glossy paint or ink. White inorganic pigments include but are not limited to antimony pigments including Antimony White:$Sb_2O_3$; lead pigments (toxic) including White Lead$(PbCO_3)_2.Pb(OH)_2$; titanium pigments including Titanium White: titanium(IV) oxide $TiO_2$ and; zinc pigments including Zinc White: Zinc Oxide (ZnO).

The term "color pigment" as referred to herein means a prime pigment, capable of selectively absorbing light and providing color to a paint or ink. There are two main types of color pigments: organic pigments, which include the brighter colors but are not highly durable in exterior use and inorganic pigments, which are not as bright as organic colors but are the most durable exterior pigments.

The term "inorganic pigment" as used herein refers to naturally occurring mineral coloring compounds typically consisting of metallic salts. Inorganic pigments are usually oxides or sulphides of one or more metals.

Inorganic pigments include for instance but are not limited to:
 Blue inorganic pigments:
 aluminum pigments, including ultramarine: a complex naturally occurring pigment of sulfur-containing sodiosilicate ($Na_{8-100}Al_6Si_6O_{24}S_{2-4}$);
 cobalt pigments, including Cobalt Blue and Cerulean Blue:cobalt(II) stannate;
 copper pigments, including Egyptian Blue: a synthetic pigment of calcium copper silicate ($CaCuSi_4O_{10}$) and Han Blue BaCuSi4O10; and
 iron pigments, including Prussian Blue: a synthetic pigment of ferric hexacyanoferrate ($Fe_7(CN)_{18}$);
 Green inorganic pigments
 cadmium pigments, including Viridian: a dark green pigment of hydrated chromium(III) oxide ($Cr_2O_3$) and Cadmium Green: a light green pigment consisting of a mixture of Cromium Yellow (CrS) and Viridian ($Cr_2O_3$);
 chromium pigments, including Chrome Green;
 copper pigments, including Paris Green: copper(II) acetoarsenite ($Cu(C_2H_3O_2)_2.3Cu(AsO_2)_2$) and Scheele's Green (also called Schloss Green): copper arsenite $CuHAsO_3$;
 Yellow inorganic pigments
 arsenic pigments including Orpiment natural monoclinic arsenic sulfide ($As_2S_3$);
 cadmium pigments including Cadmium Yellow:cadmium sulfide (CdS);
 chromium pigments including Chrome Yellow: natural pigment of lead(II) chromate ($PbCrO_4$);
 cobalt pigments including Aureolin (also called Cobalt Yellow): Potassium cobaltinitrite ($Na_3CO(NO_2)_6$;
 iron pigments including Yellow Ochre: a naturally occurring clay of hydrated iron oxide ($Fe_2O_3.H_2O$);
 lead pigments including Naples Yellow;
 titanium pigments including Titanium Yellow;
 tin pigments including Mosaic gold: stannic sulfide ($SnS_2$);
 Orange inorganic pigments
 cadmium pigments including Cadmium Orange: an intermediate between cadmium red and cadmium yellow: cadmium sulfoselenide;
 chromium pigments including Chrome Orange: a naturally occurring pigment mixture composed of lead(II) chromate and lead(II) oxide. ($PbCrO_4+PbO$)
 Red inorganic pigments
 cadmium pigments including Cadmium Red: cadmium selenide (CdSe);
 iron oxide pigments including Sanguine, Caput Mortuum, Oxide Red, Red Ochre: anhydrous $Fe_2O_3$, Burnt Sienna: a pigment produced by heating Raw Sienna, Venetian Red;
 lead pigments (toxic) including Red Lead: lead tetroxide, $Pb_3O_4$;
 mercury pigments (toxic) including Vermilion: Synthetic and natural pigment: Occurs naturally in mineral cinnabar; Mercuric sulfide (HgS);
 Brown inorganic pigments
 clay earth pigments (naturally formed iron oxides) including Raw Umber: A natural clay pigment consisting of iron oxide, manganese oxide and aluminum oxide: $Fe_2O_3+MnO_2+nH_2O+Si+AlO_3$; Raw Sienna: a naturally occurring yellow-brown pigment from limonite clay;
 Black inorganic pigments
 Carbon pigments including Carbon Black, Ivory Black, Vine Black, Lamp Black;
 Iron Pigments including $Fe_3O_4$;
 Titanium pigments: Titanium Black;
 Grey inorganic pigments
 Payne's grey: a mixture of Ultramarine and black or of Ultramarine and Sienna;

The term "organic pigment" as used herein refers to synthetic organic coloring compounds, which are carbon based molecules manufactured from petroleum compounds, acids, and other chemicals, usually under intense heat or pressure.

Organic pigments include for instance but are not limited to:
 Yellow organic pigments:
 Yellow Lakes, which are transparent pigments used as a yellow to cover other inks but not hide them, Tartrazine Yellow Lake (also called FD&C Yellow No. 5 and used as a dyestuff in foods), Hansa Yellows, and Diarylide Yellows, which are the most common yellow pigments used in printing inks. Fluorescent Yellow is also used in some specialty applications. Organic Yellows are commonly used to replace Chrome Yellows;

Orange organic pigments:

The most common orange pigment is Diarylide Orange, a transparent yet not very fast-to-light pigment. Other assorted orange materials tend to be used where orange pigments are necessary, and include DNA Orange, Pyrazolone Orange, Fast Orange F2G, Benzimidazolone Orange HL, and Ethyl Lake Red C;

Red organic pigments:

Reds include Para Reds, Toluidine Red, ["Permanent Red "R"], Carmine F.B., Naphthol Reds and Rubines, Permanent Red FRC, Bordeaux FRR, Rubine Reds, Lithol Reds, BON Red, Lithol Rubine 4B, BON Maroon, Rhodamine 6G, Lake Red C, BON Arylamide Red, Quinacrinone Magentas, Copper Ferrocyanide Pink, Benzimidazolone Carmines and Reds, Azo Magenta G, Anthraquinone Scarlet, and Madder Lakes;

Blue organic pigments:

'Blues'. Blues include Phthalocyanine Blues (the most commonly used group of organic blue pigments), PMTA Victoria Blue, Victoria Blue CFA, Ultramarine Blue, Indanthrene Blue, Alkali Blues, and Peacock Blue;

Violet organic pigments:

Violets overlap slightly with some of the bluer reds (such as Benzimidazolone Bordeaux HF 3R (see Benzimidazolone Carmines and Reds), and also include such pigments as PMTA Rhodamine, PMTA Violet (also known as Methyl Violet), Dioxazine Violet (RL) Carbazole Violet, Crystal Violet, Dioxazine Violet B, and Thioindigoid Red;

Green organic pigments:

A common series of greens are the Phthalocyanine Greens as well as the PMTA Greens;

Brown organic pigments:

Brown pigments include Diazo Brown and Benzimidazolone Brown HER;

The terms "extender pigment" or "filler pigment" as used herein refers to any pigment (as defined herein) having a low refractive index or opacity and therefore not providing color or hiding power to a substance. Extender or filler pigments appear transparent in a paint or ink. Extender pigments have significant positive effects on various properties of the paint for example, as described further below, mica can improve the water resistance of a film due to its "platy" particle shape and tendency to orient itself in overlapping layers horizontal to the surface. Extender pigments or filler pigments for instance include but are not limited to Barium Sulphate, Calcium Carbonate, Magnesium Silicate, Mica, Kaolin (China Clay), Asbestine, Talc, Silica/Quartz, Alumina Hydrate, Kalunite, Pumice, Bentonite, Vermiculite, and Glass Beads.

The invention will now be further explained in detail with reference to various embodiments. It will be understood that each embodiment is provided by way of example and is in no way limiting to the scope of the invention. In this respect, it will be clear to those skilled in the art that various modifications and variations can be made to the present invention without departing from the scope or spirit of the invention. For instance, features illustrated or described as part of one embodiment, can be used in another embodiment to yield a still further embodiment. Thus, it is intended that the present invention covers such modifications and variations as encompassed within the scope of the appended claims and equivalents thereof.

The present invention provides coloured fiber cement decking products having improved properties with regard to suitability for outdoor use without suffering from the undesirable consequences of varying weather conditions and humidity, such as moss and fungi growth, rotting, splitting, splintering, cracking and/or termite damage, which are encountered with the existing decking products that are currently on the market.

In addition, the fiber cement decking products as provided by the present invention have an attractive appearance because of their specific mass-colouration feature, whereby the surface of these products displays (at least part of) the inner texture and colour of the core materials. This provides the products with a natural yet modern look and additionally provides for the esthetical advantage that any defects or damages occurring during the life-time of the products will be less visible compared to coated products, the latter of which are typically not coloured in the mass.

Accordingly, in view of the above, it is clear that the present invention provides fiber cement products, which are both technically (good mechanical strength and impact resistance and highly wearproof) and esthetically (intense though natural appearing colour and no colour change upon damage) improved.

In a first aspect, the present invention provides fiber cement decking products, which fiber cement decking products are coloured in the mass.

In the context of the present invention, fiber cement products are to be understood as cementitious products comprising cement and synthetic (and optionally natural) fibers. The fiber cement products are made out of fiber cement slurry, which is formed in a so-called "green" fiber cement product, and then cured.

Dependent to some extent on the curing process used, the fiber cement slurry typically comprises water, process or reinforcing fibers which are synthetic organic fibers (and optionally also natural organic fibers, such as cellulose), cement (e.g. Portland cement), limestone, chalk, quick lime, slaked or hydrated lime, ground sand, silica sand flour, quartz flour, amorphous silica, condensed silica fume, microsilica, kaolin, metakaolin, wollastonite, mica, perlite, vermiculite, aluminum hydroxide (ATH), pigments, antifoaming agents, flocculants, and/or other additives.

Fiber cement products that are so-called "coloured in the mass" are products comprising in at least part of their fiber cement structure (i.e. internal fiber cement structure and/or externally exposed and visible fiber cement surface), and preferably but not necessarily throughout their entire fiber cement structure (i.e. internal fiber cement structure and externally exposed and visible fiber cement surface), at least one pigment, such as preferably one or more opaque and/or semi-opaque pigments.

These one or more pigments are preferably present in a total amount of about 2 weight % to about 15 weight %, particularly of about 3 weight % to about 10 weight %, more particularly from about 3 weight % to about 9 weight %, such as particularly of about 3 weight % to about 7 weight %, such as most particularly of about 4 weight % to about 5 weight % (weight % compared to the total dry weight of the fiber cement composition).

Thus, in particular embodiments, "(mass-)coloured fiber cement products" or "fiber cement products coloured in the mass" as referred to interchangeably herein can comprise one or more fiber cement layers that comprise at least one pigment while other fiber cement layers do not. These fiber cement products are also referred to as being partially or partly coloured in the mass, or as being partially or partly mass-coloured, or as being partially or partly throughcoloured.

However, in alternative particular embodiments, "(mass-)coloured fiber cement products" or "fiber cement products coloured in the mass" as referred to interchangeably herein may comprise at least one pigment, which is preferably an opaque pigment or a semi-opaque pigment, throughout their entire mass or structure (i.e. comprising internal fiber cement structure and externally exposed and visible fiber cement surface). These fiber cement products are also referred to as being completely, totally or entirely mass-coloured, or as being completely, totally or entirely coloured in the mass, or as being completely, totally or entirely through-coloured.

The one or more pigments present in the fiber cement decking products of the present invention may be opaque pigments and semi-opaque pigments or a combination thereof and optionally transparent pigments.

Pigments provide color, hiding, and/or are present as extenders. Pigments include those in the form of titanium oxide, iron oxides, calcium carbonate, spinell pigments, titanates, clay, aluminum oxide, silicon dioxide, magnesium oxide, magnesium silicate, barium metaborate monohydrate, sodium oxide, potassium oxide, talc, barytes, zinc oxide, zinc sulfite and mixtures thereof or organic alkaliresistant pigments such as phtalocyanines and azo compounds.

In particular embodiments, the one or more pigments for use in the fiber cement decking products of the present invention are chosen from the group consisting of brown iron oxides, black iron oxides and white titanium oxides. In further particular embodiments, the one or more pigments for use in the fiber cement decking products of the present invention are brown iron oxide, black iron oxide and optionally white titanium oxide in a total amount of about 2 to 10 weight % (weight % total pigment compared to the total dry weight of the fiber cement composition). In yet further particular embodiments, the one or more pigments for use in the fiber cement decking products of the present invention are brown iron oxide, black iron oxide, and optionally white titanium oxide in a total amount of about 3 to 5 weight % (weight % total pigment compared to the total dry weight of the fiber cement composition).

In particular embodiments of the present invention, the pigments suitable for use in the fiber cement decking products of the present invention are essentially alkali-resistant, i.e. resistant to a pH of about 8 or higher, such as resistant to a pH of about 9 or higher, such as resistant to a pH of about 10 or higher, such as resistant to a pH of about 11 or higher, more particularly resistant to a pH of higher than about 12 or higher than about 13.

The fiber cement products of the present invention comprise 20 to 95 weight % cement as hydraulic binder. Cement in the products of the invention is selected from the group consisting of Portland cement, cement with high alumina content, Portland cement of iron, trass-cement, slag cement, plaster, calcium silicates formed by autoclave treatment and combinations of particular binders. In more particular embodiments, cement in the products of the invention is Portland cement.

In particular embodiments, the fiber cement products of the present invention comprise from about 0.1 to about 5 weight %, such as particularly from about 0.5 to about 4 weight % of synthetic fibers, such as more particularly between about 1 to 3.5 weight % of synthetic fibers, such as most particularly between about 2.5 to 3.5 weight % of synthetic fibers with respect to the total weight of the fiber cement product.

According to further particular embodiments, the fiber cement products according to the invention are characterized in that they comprise synthetic fibers in a weight % of about 0.1 to about 5 with respect to the total weight of the fiber cement product. In particular embodiments, these fibers are selected from the group consisting of polypropylene, polyvinylalcohol polyacrylonitrile fibers, polyethyelene, polyamide fibers, polyester fibers, aramide fibers and carbon fibers.

In further particular embodiments, natural fibers, such as cellulose fibers may in addition be added to the fiber cement formulations of the present invention. In these particular embodiments, the fiber cement products of the present invention may comprise from about 2 to about 5 weight %, such as particularly about 2 to about 4 weight % of cellulose fibers, such as more particularly about 3 weight % of cellulose fibers with respect to the total weight of the fiber cement product. These cellulose fibers may be derived from wood or annual plants.

In further particular embodiments, additional fibers may be added to the cement formulations and may be selected from the group consisting of glass fibers, rockwool fibers, slag wool fibers, wollastonite fibers, ceramic fibers and the like. In further particular embodiments, the fiber cement products of the present invention may additionally comprise fibrils fibrids, such as for example but not limited to, polyolefinic fibrils fibrids % in a weight % of about 0.1 to 3, such as "synthetic wood pulp".

In particular embodiments, the mass-coloured fiber cement decking products of the present invention comprise a combination of at least two different types of synthetic fibers.

In further particular embodiments, the mass-coloured fiber cement decking products of the present invention comprise a combination of at least two different types of synthetic fibers, wherein the at least two different types of synthetic fibers are polypropylene fibers and polyvinyl alcohol fibers. In still further particular embodiments, the mass-coloured fiber cement decking products of the present invention at least comprise polypropylene fibers in an amount of about 0.1 weight % to about 1 weight % (weight % compared to the total dry weight of the fiber cement composition) and polyvinyl alcohol fibers in an amount of about 0.1 weight % to about 3 weight % (weight % compared to the total dry weight of the fiber cement composition). In yet further particular embodiments, the mass-coloured fiber cement decking products of the present invention at least comprise a combination of polypropylene fibers in an amount of about 0.5 weight % (weight % compared to the total dry weight of the fiber cement composition) and polyvinyl alcohol fibers in an amount of about 2 weight % to about 2.5 weight % (weight % compared to the total dry weight of the fiber cement composition).

In yet further particular embodiments, the mass-coloured fiber cement decking products of the present invention comprise a combination of polypropylene fibers in an amount of about 0.5 weight % (weight % compared to the total dry weight of the fiber cement composition), polyvinyl alcohol fibers with a thickness of about 7 dtex to about 9 dtex in an amount of about 1 weight % to about 1.5 weight % (weight % compared to the total dry weight of the fiber cement composition) and polyvinyl alcohol fibers with a thickness of about 1 dtex to about 4 dtex in an amount of about 1 weight % (weight % compared to the total dry weight of the fiber cement composition).

In still further particular embodiments, the mass-coloured fiber cement decking products of the present invention comprise a combination of polypropylene fibers with a thickness of about 12 dtex to about 18 dtex in an amount of about 0.5 weight % (weight % compared to the total dry weight of the fiber cement composition), polyvinyl alcohol fibers with a thickness of about 7 dtex, in an amount of about 1 weight % to about 1.5 weight % (weight % compared to the total dry weight of the fiber cement composition) and polyvinyl alcohol fibers with a thickness of about 2 dtex to about 4 dtex in an amount of about 1 weight % (weight % compared to the total dry weight of the fiber cement composition). As will become clear from the Examples described further herein, the specific combination of polypropylene fibers and polyvinyl alcohol fibers has a particularly beneficial effect on the mechanical performance (mechanical strength and impact resistance) of the fiber cement decking products as disclosed by the present invention.

In particular embodiments, the mass-coloured fiber cement decking products of the present invention comprise amorphous silica. In further particular embodiments, the mass-coloured fiber cement decking products of the present invention comprise amorphous silica in an amount of about 2 weight % to about 10 weight %, more particularly in an amount of about 4 weight % to about 9 weight %, most particularly in an amount of about 7 weight % (weight % compared to the total dry weight of the fiber cement composition). As will become clear from the Examples described further herein, amorphous silica has an advantageous effect on the mechanical strength of the fiber cement decking products as disclosed by the present invention.

According to particular embodiments, the fiber cement products according to the invention optionally comprise further components. These further components in the fiber cement products of the present invention may be selected from the group consisting of water, sand, silica sand flour, condensed silica fume, microsilica, fly-ashes, ground quartz, the ground rock, clays, pigments, kaolin, metakaolin, blast furnace slag, carbonates, puzzolanas, aluminium hydroxide, wollastonite, mica, perlite, calcium carbonate, and other additives (e.g. colouring additives) etc. It will be understood that each of these components is present in suitable amounts, which depend on the type of the specific fiber cement product and can be determined by the person skilled in the art. In particular embodiments, the total quantity of such further components is preferably lower than 70 weight % compared to the total initial dry weight of the composition.

In particular embodiments, the mass-coloured fiber cement decking products of the present invention comprise mica, extender pigments, or metals, which provide the products with a sparkling or shimmering effect. In further particular embodiments, the mass-coloured fiber cement decking products of the present invention comprise mica in an amount of about 2 weight % to about 10 weight %, more particularly in an amount of about 4 weight % to about 9 weight %, most particularly in an amount of about 7 weight % (weight % compared to the total dry weight of the fiber cement composition).

Further additives that may be present in the fiber cement products of the present invention may be selected from the group consisting of dispersants, plasticizers, antifoam agents and flocculants. The total quantity of additives is preferably between about 0.1 and about 2 weight % compared to the total initial dry weight of the composition.

In particular embodiments of the present invention, the fiber cement decking products of the present invention are surface treated. In further particular embodiments, the mass-coloured fiber cement decking products are abrasively blasted. In other particular embodiments, the mass-coloured fiber cement decking products have an embossed surface pattern. In yet other particular embodiments, the mass-coloured fiber cement decking products have an engraved surface pattern.

In particular embodiments, the fiber cement decking products of the invention have a thickness of between about 15 mm and about 25 mm, in particular between about 20 mm and about 25 mm.

In particular embodiments, the fiber cement decking products of the invention have a length of between about 2 m and about 6 m, in particular between about 2 m and about 4 m, more in particular of about 4 m.

In particular embodiments, the fiber cement decking products of the invention have a width of between about 100 mm and about 250 mm, in particular between about 140 mm and about 200 mm, more in particular between about 150 mm and about 200 mm, most in particular of about 200 mm.

The coloured fiber cement products as referred to herein thus include floor covering products made out of fiber cement, such as for instance but not limited to outdoor decking products and the like. According to further particular embodiments, the fiber cement products of the present invention are fiber cement planks.

According to further particular embodiments, the fiber cement products of the present invention are fiber cement planks having a thickness of about 20 mm to 25 mm, a width of about 200 mm, and a length of about 4 m.

According to further particular embodiments, the fiber cement products of the present invention are fiber cement tiles having a thickness of about 20 mm to 25 mm, a width of about 200 mm to 1000 mm, and a length of about 200 mm to 1000 mm.

In a second aspect, the present invention provides methods for the manufacture of mass-coloured fiber cement decking products, at least comprising the steps of:
(i) Providing a fiber cement slurry;
(ii) Manufacturing a fiber cement decking product by means of a fiber cement production process;
(iii) Curing the fiber cement decking product,
wherein said methods are characterized in that one or more pigments are added to said fiber cement product during step (i) and/or step (ii).

In the first step (i) of the methods of the present invention, a fiber cement slurry can be prepared by using one or more sources of at least cement, water and fibers in the amounts as previously disclosed herein. In certain specific embodiments, these one or more sources of at least cement, water and fibers are operatively connected to a continuous mixing device constructed so as to form a cementitious fiber cement slurry.

Once a fiber cement slurry is obtained, the manufacture of the fiber cement products can be executed according to any known procedure. Indeed, in the methods of the invention, the step (ii) of providing a fiber cement product, can be performed according to any method known in the art for preparing fiber cement products, which products at least comprise water, cement and fibers.

The process most widely used for manufacturing fiber cement products is the Hatschek process, which is performed using a modified sieve cylinder paper making machine. Other manufacturing processes that can be used include the Magnani process, injection, flow-on and others. In particular embodiments, the fiber cement products of the present invention are provided by using the Hatschek process. The "green" or uncured fiber cement product is optionally post-compressed usually at pressures in the range from about 22 to about 30 MPa to obtain the desired density.

Thus, in certain particular embodiments, the "green" or uncured fiber cement product is post-compressed usually at pressures in the range from about 22 to about 30 MPa to obtain the desired density.

The processes according to the present invention may further comprise the step of cutting the fiber cement products to a predetermined length to form a fiber cement decking product. Cutting the fiber cement products to a predetermined length can be done by any technique known in the art, such as but not limited to water jet cutting, air jet cutting or the like. The fiber cement products can be cut to any desirable length and width but preferably to the dimensions as disclosed previously herein for the decking products of the present invention. Thus, in particular embodiments, the mass-coloured fiber cement decking products of the present invention can be cut into specific dimensions so as to form fiber cement decking planks. In alternative particular embodiments, the mass-coloured fiber cement decking products of the present invention can be cut into specific dimensions so as to form fiber cement decking tiles.

It will be understood by the skilled person that the processes of the present invention may further comprise additional steps of processing the produced fiber cement products.

For instance, in certain particular embodiments, during the processes of the present invention, the fiber cement slurry and/or the fiber cement products may undergo various intermediate treatments, such as but not limited to treatment with one or more hydrophobic agents, treatment with one or more flocculants, additional or intermediate pressing steps, etc.

As soon as the fiber cement products are formed, these are trimmed at the lateral edges. The border strips can optionally be recycled through immediate mixing with the recycled water and directing the mixture to the mixing system again.

In step (iii) of the methods of the present invention, the obtained fiber cement products are cured. Indeed, after production, fiber cement products can be allowed to cure over a time in the environment in which they are formed, or alternatively can be subjected to a thermal cure (e.g. by autoclaving or the like).

In particular embodiments, the fiber cement decking products of the present invention are air-cured. This air-curing step involves curing the green fiber cement decking products under ambient conditions for about 2 to 4 weeks, such as for about 3 weeks.

It has been found by the present inventors that air-cured fiber cement decking products as produced according to the methods as disclosed herein perform particularly well, especially having regard to their mechanical characteristics, such as impact resistance and mechanical strength. This will become clear from the Examples as further described herein.

In yet further particular embodiments, the "green" fiber cement products may be first pre-cured to the air, after which the pre-cured product is further air-cured until it has its final strength to give the product its final properties.

In particular embodiments of the present invention, the processes may further comprise the step of thermally drying the obtained fiber cement products. After curing, the fiber cement product being a panel, sheet or plate, may still comprise a significant weight of water, present as humidity. This may be up to 10 even 15% w, expressed per weight of the dry product. The weight of dry product is defined as the weight of the product when the product is subjected to drying at 105° C. in a ventilated furnace, until a constant weight is obtained.

In certain embodiments, the fiber cement product is dried. Such drying is done preferably by air drying and is terminated when the weight percentage of humidity of the fiber cement product is less than or equal to 8 weight %, even less than or equal to 6 weight %, expressed per weight of dry product, and most preferably between 4 weight % and 6 weight %, inclusive.

During steps (i) and/or (ii) of the methods of the present invention, one or more pigments are added to the fiber cement in order to mass-colour the fiber cement product in production. Methods for colouring fiber cement products in the mass are known to the person skilled in the art.

This may for example (but not necessarily only) be achieved by adding one or more pigments to the fiber cement slurry prior to the production of the fiber cement product and/or by integrating (such as by spraying, pouring, or spattering) one or more layers of a pigment slurry in one or more fiber cement layers (composing the eventual fiber cement end product) during a Hatschek or other (e.g. Magnani, extrusion, injection, flow-on) fiber cement process.

In particular embodiments of the methods of the present invention, the one or more pigments for use in the fiber cement decking products of the present invention are chosen from the group consisting of brown iron oxides, black iron oxides and white titanium oxides. In further particular embodiments, the one or more pigments for use in the fiber cement decking products of the present invention are brown iron oxide, black iron oxide and optionally white titanium oxide in a total amount of about 2 to 10 weight %, preferably in an amount of about 3 weight % to about 9 weight %, more preferably in an amount of about 3 weight % to about 7 weight %, more preferably in an amount of about 3 weight % to about 5 weight %, most preferably in an amount of about 4 weight % (weight % total pigment compared to the total dry weight of the fiber cement composition).

In yet further particular embodiments, the one or more pigments for use in the fiber cement decking products of the present invention are brown iron oxide, black iron oxide, red iron oxide, green chrome oxide and white titanium oxide in an amount of about 3 weight % to about 8 weight %, most preferably in an amount of about 4 weight % (weight % total pigment compared to the total dry weight of the fiber cement composition).

In yet further particular embodiments, the one or more pigments for use in the fiber cement decking products of the present invention are pale-coloured and/or white pigments, including but not limited to titanium oxide, in an amount of about 3 weight % to about 8 weight %, more preferably in an amount of about 4 weight % to about 8 weight %, most preferably in an amount of about 4 weight % to about 5 weight % (weight % total pigment compared to the total dry weight of the fiber cement composition).

In particular embodiments of the present invention, the pigments suitable for use in the fiber cement decking products of the present invention are essentially alkali-resistant, i.e. resistant to a pH of about 8 or higher, such as resistant to a pH of about 9 or higher, such as resistant to a pH of about 10 or higher, such as resistant to a pH of about 11 or higher, more particularly resistant to a pH of higher than about 12 or higher than about 13.

In particular embodiments, mass-colouration of the products according to the methods of the present invention is achieved by adding one or more pigments during step (i) of providing a fiber cement slurry. In these particular embodiments, the mass-coloured fiber cement decking products of the present invention are completely coloured in the mass (i.e. throughout their entire structure).

In alternative particular embodiments, mass-colouration of the products according to the methods of the present invention is achieved by incorporating (such as by spraying, pouring, or spattering) one or more layers of a pigment slurry in one or more fiber cement layers (which layers compose the eventual fiber cement end product) during a Hatschek or other (e.g. Magnani, extrusion, injection, flow-on) fiber cement process.

A pigment slurry as described herein can be prepared according to any standard method known in the art and can be applied to the fiber cement film (or layer) in e.g. solid, liquid, gas or plasma form. Also, a pigment slurry as described herein can be applied in any form such as for instance as a suspension, as an emulsion, as a solution, as an aerosol etc.

The dispensing device for applying the pigment slurry to the fiber cement film (or layer) can be a flow-on distribution device, a spattering distribution device, a spraying distribution device, a sprinkling distribution device and/or a roll coating distribution device and can be installed at any suitable position of the fiber cement production line.

Adding one or more pigments to a fiber cement film (or layer) so as to mass-colour the fiber cement products can thus be done at any stage during the formation of the fiber cement film (i.e. in the case of a Hatschek or Magnani process) or fiber cement layer (in the case of a flow-on process).

In particular embodiments, adding one or more pigments to one or more fiber cement films (or layers) is performed after transfer of the fiber cement film (or layer) onto the transport belt. In these embodiments, the fiber cement film (or layer) can be provided uniformly with a thin layer of pigmented slurry within the reach limits of the dispensing device used for colouration.

Figure 4:
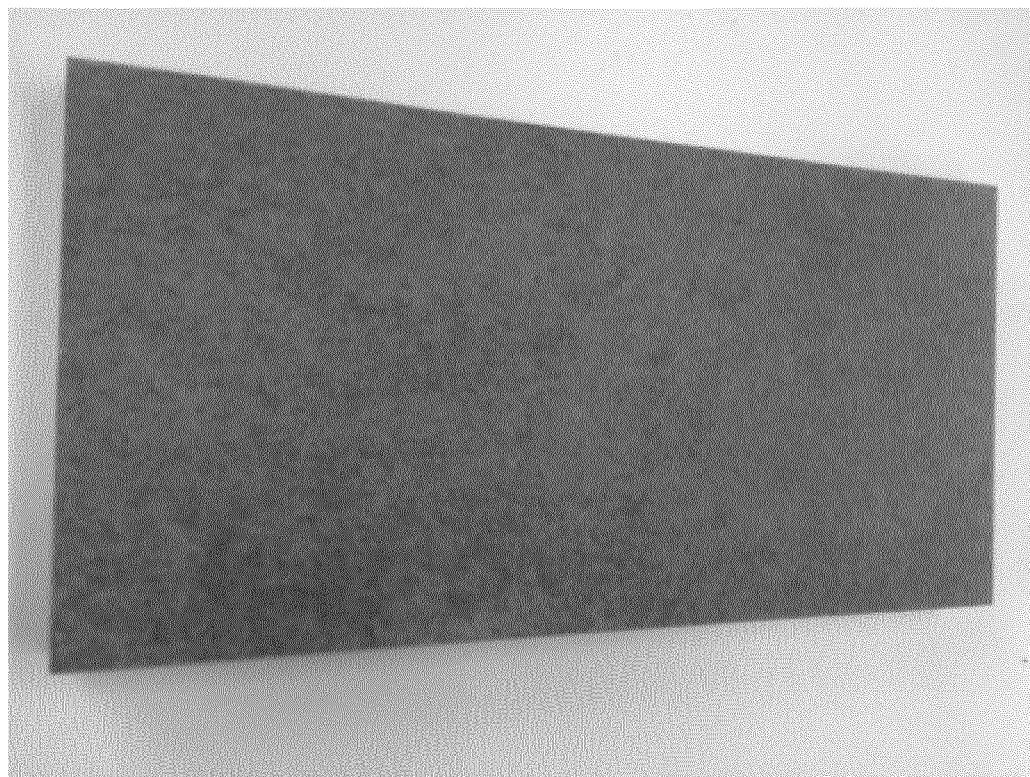
FIGS. 4, 5 and 11 show fiber cement decking products according to the present invention, which were manufactured by adding one or more pigments on the sieve of the Hatschek machine during the formation of one or more upper fiber cement films. As can be seen from the pictures in FIGS. 4, 5 and 11, this results in a patchy marble-like coloured pattern.
Figure 5:
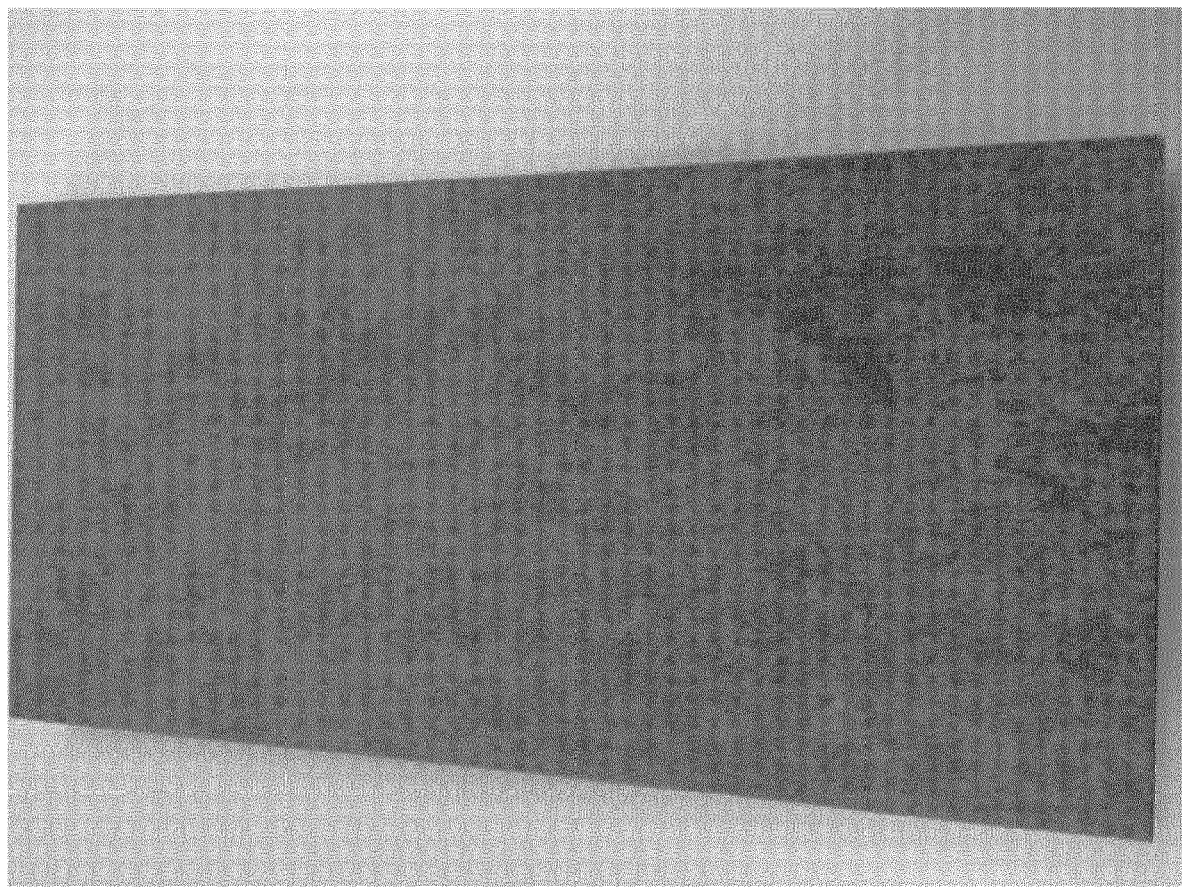
Figure 6:
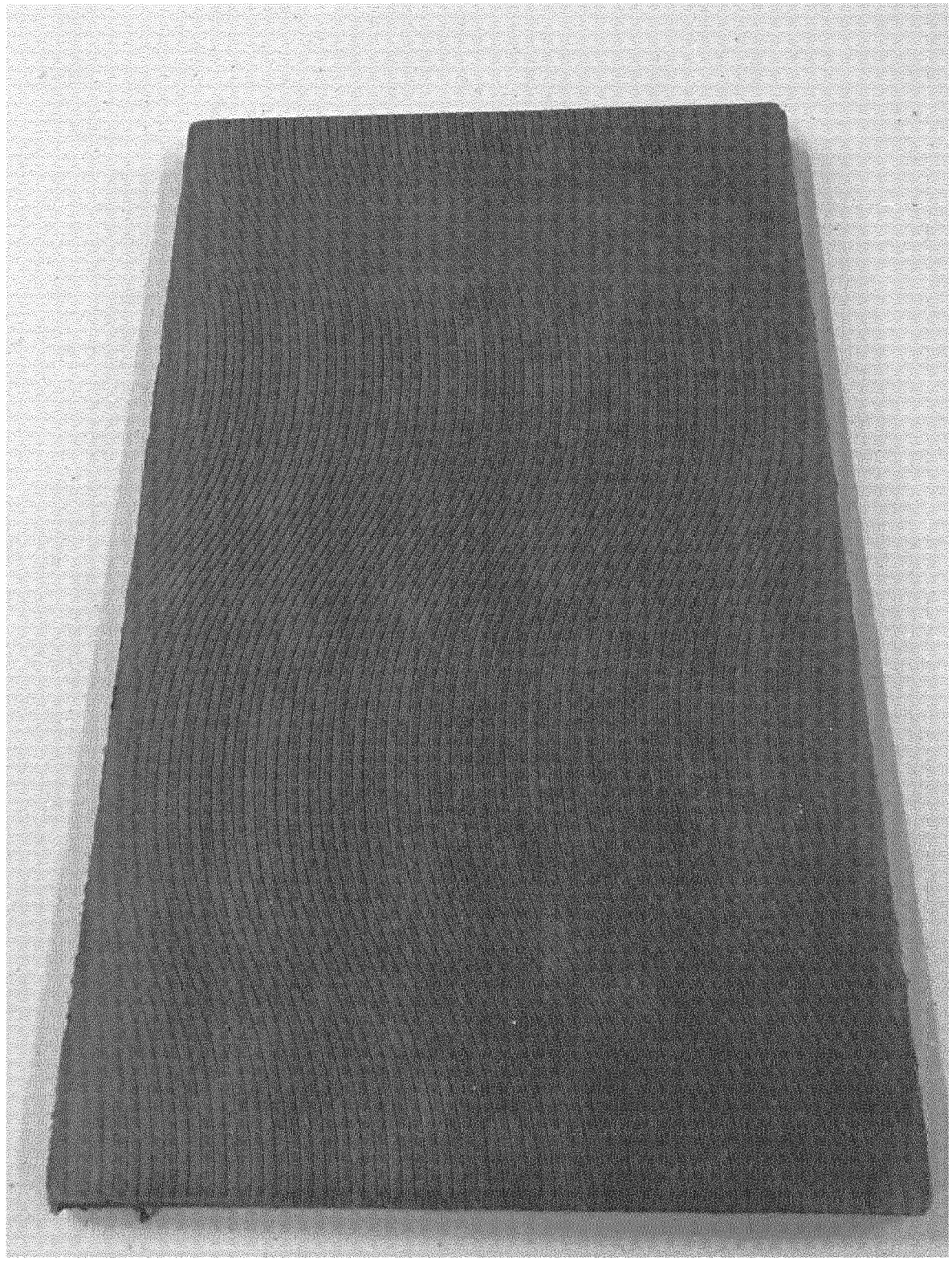
FIGS. 6 to 10 show fiber cement decking products with an embossed surface decorative pattern according to the present invention.
Figure 7:
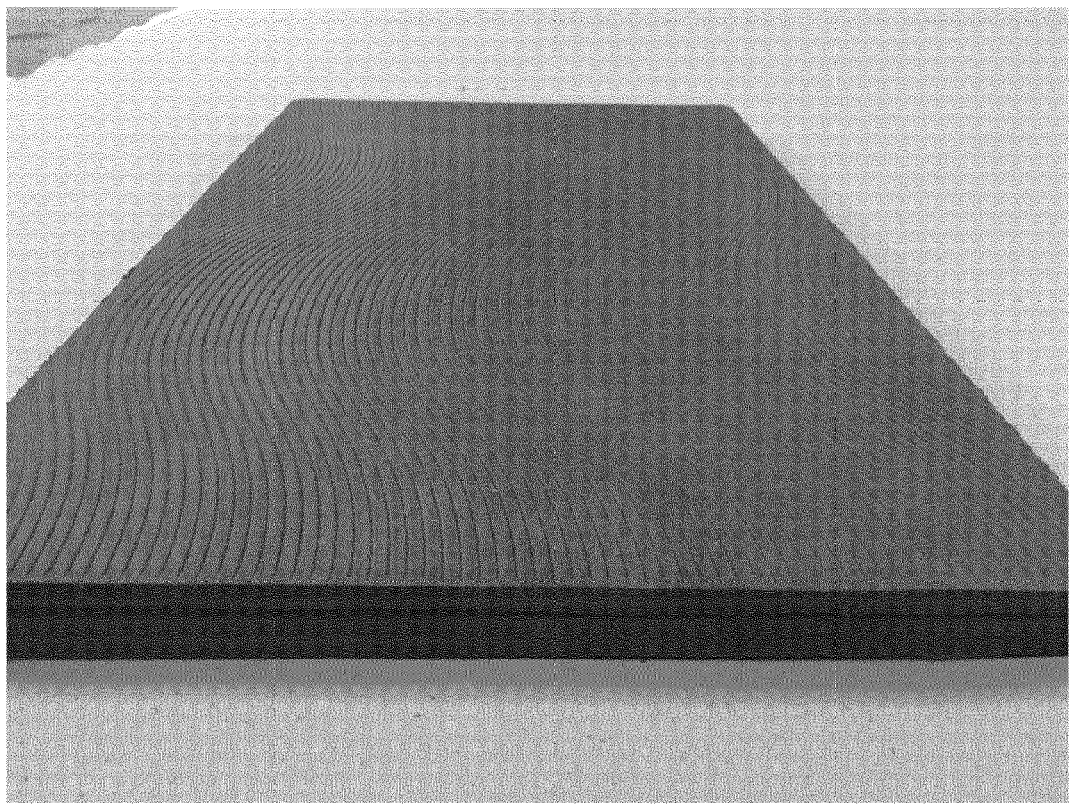
Figure 8:
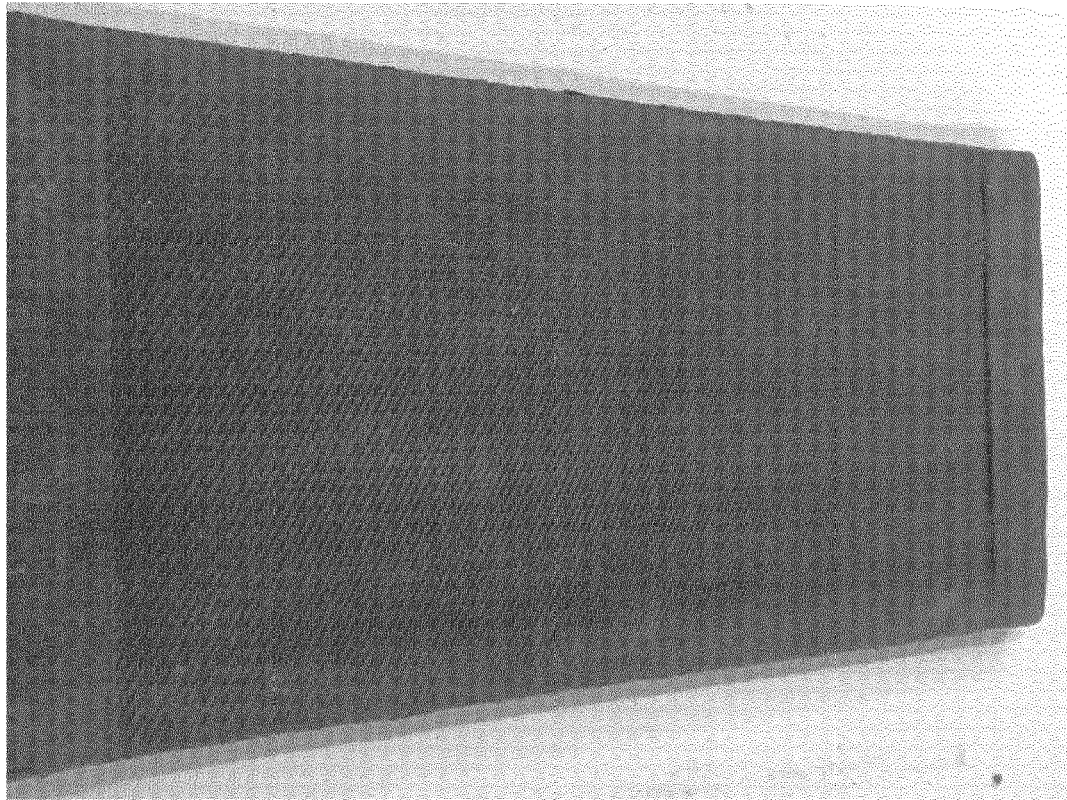
Figure 9:
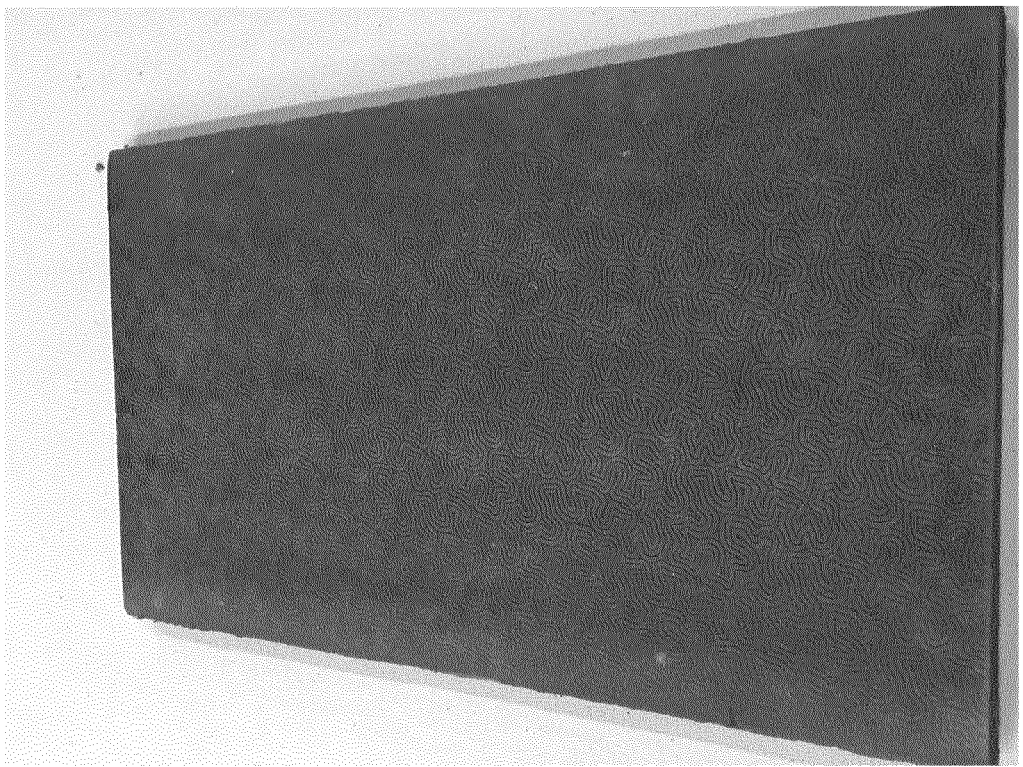
Figure 10:
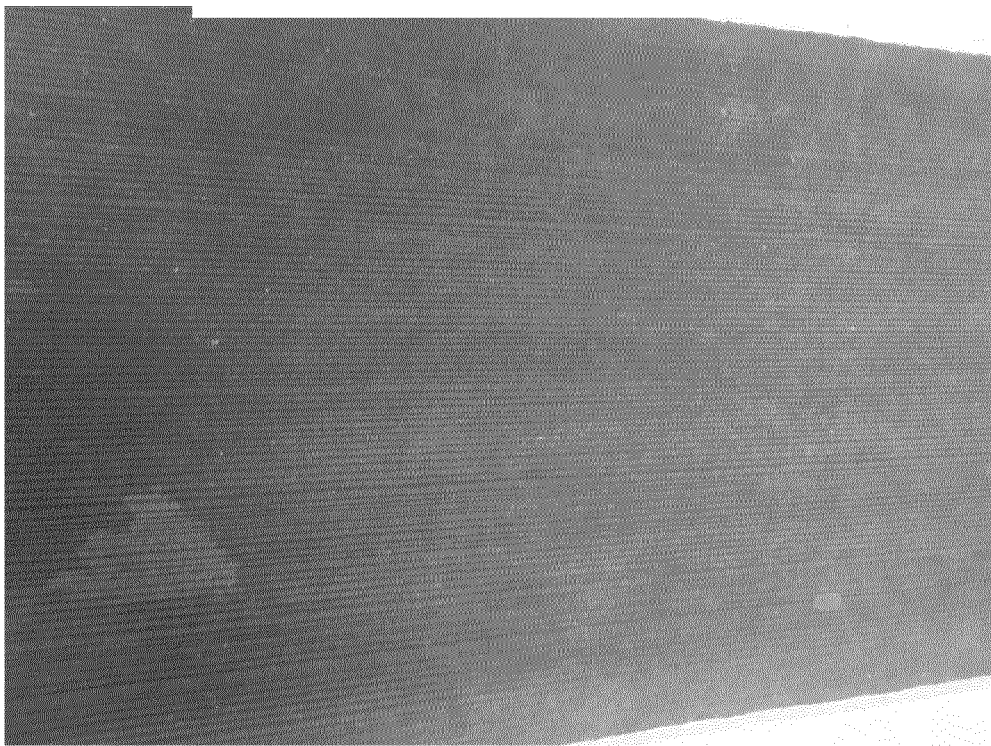
Figure 11:

In alternative and/or additional particular embodiments of the methods of the present invention, adding one or more pigments so as to mass-colour the fiber cement products is performed in a Hatschek or a Hatschek-like process (such as a Magnani process, an extrusion process, an injection process, a flow-on process or the like) and is performed during the formation of the fiber cement film on the sieve and thus before transfer of the fiber cement film (or layer) onto the transport belt. In these embodiments, the pigment slurry is provided via one or more pigment slurry feeds and is collected by the surface of the sieve of the Hatschek machine on which sieve the fiber cement film is created. In these particular embodiments, due to the inherent structure of the sieve, patches or clouds of colour are introduced on the surface of the sieve and are consequently visibly integrated into the fiber cement film upon its formation. In these particular embodiments, the mass-coloured fiber cement decking products of the present invention are non-uniformly mass-coloured, thereby providing the product with a cloudy, marble-like coloured pattern and any variants thereof (see e.g. FIGS. 4, 5 and 11).

In further particular embodiments, the mass-coloured fiber cement decking products of the present invention are completely coloured in the mass, by applying (such as by spraying, pouring, or spattering) layers of a pigment slurry on top of all fiber cement layers (which layers compose the eventual fiber cement end product) during a Hatschek or other (e.g. Magnani, extrusion, injection, flow-on) fiber cement process.

In alternative particular embodiments, the mass-coloured fiber cement decking products of the present invention are only partially coloured in the mass, by applying or incorporating (such as by spraying, pouring, or spattering) a pigment slurry in only one or more of the most upper fiber cement layers (which layers compose the eventual fiber cement end product) during a Hatschek or other (e.g. Magnani, extrusion, injection, flow-on) fiber cement process. For instance, the mass-coloured fiber cement decking products of the present invention are partially coloured in the mass, by applying or incorporating (such as by spraying, pouring, or spattering) a pigment slurry in the one or more most upper layers of the fiber cement end product, such as in the 5 to 50, more particularly the 5 to 40, most particularly the 5 to 30 most upper Hatschek layers of the fiber cement product. In these particular embodiments, the mass-coloured fiber cement decking products of the present invention, are partially coloured in the mass, such as for instance but not limited to partially mass-coloured throughout an entire top surface layer, having a thickness between about 1 mm to about 10 mm, such as between about 1 mm to about 3 mm.

By adding one or more pigments (i.e. a pure pigment, a pigment slurry comprising a pigment or a pigment slurry comprising a blend of different pigments) to only one or more top fiber cement films or layers of the boards to be produced, the amount of pigment to be used is limited (making the method more cost-effective) and there is no colour contamination of the fiber cement slurry in the fiber cement slurry vats of the Hatschek machine.

In particular embodiments of the present invention, the methods further comprise the step of surface treating the produced mass-coloured fiber cement decking products.

Figure 12:
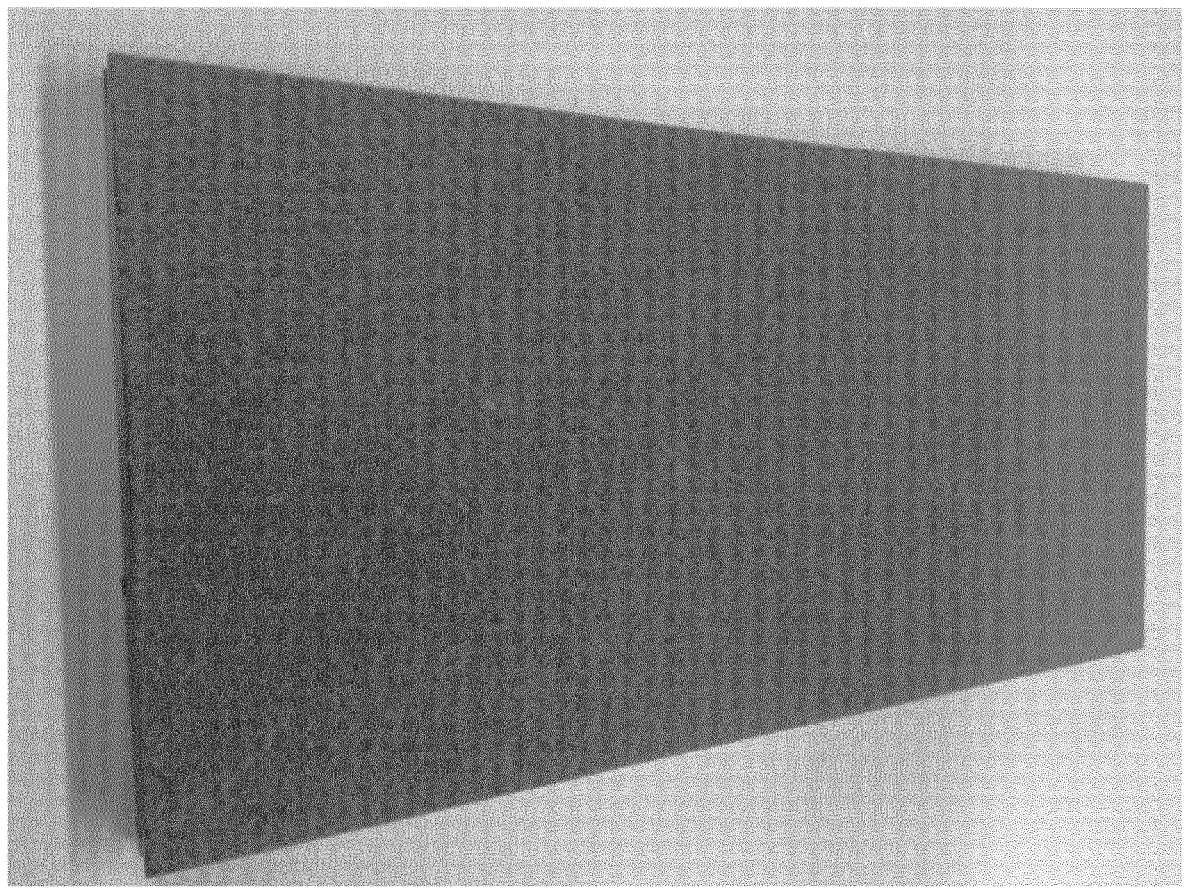
FIG. 12 show fiber cement decking products with an abrasively blasted surface decorative pattern according to the present invention.

In further particular embodiments, the mass-coloured fiber cement decking products are abrasively blasted (see e.g. FIG. 12).

Abrasive blasting in the context of the present invention is the abrasion of a surface by forcibly propelling a stream of abrasive material or a stream of abrasive particles against the surface to be treated under high pressure. Such abrasive particles may be mineral particles (e.g. but not limited to sand, garnet, magnesium sulphate, kieserite, . . . ), natural or organic particles (such as but not limited to crushed nut shells or fruit kernels, . . . ), synthetic particles (such as but not limited to corn starch or wheat starch and alike, sodium bicarbonate, dry ice and alike, copper slag, nickel slag, or coal slag, aluminum oxide or corundum, silicon carbide or carborundum, glass beads, ceramic shot/grit, plastic abrasive, glass grit, and alike) metal grit (such as but not limited to steel shot, steel grit, stainless steel shot, stainless steel grit, corundum shot, corundum grit, cut wire, copper shot, aluminum shot, zinc shot) and any combination of these.

In particular embodiments, the abrasive material can be stainless steel grit, such as but not limited to GRITTAL® Rust-proof High-Chromium-Cast-Iron-Grit. In these embodiments, the GRITTAL® Rust-proof High-Chromium-Cast-Iron-Grit particles have a length ranging from about 0.09 mm to about 3.5 mm. In further particular embodiments, the abrasive material is stainless steel grit having a microstructure comprising martensitic stainless steel, optionally with chromium carbides. In these embodiments, the martensitic stainless steel particles have a length ranging from about 0.09 mm to about 3.5 mm.

In particular embodiments, the abrasive material are stainless steel shot particles having a diameter ranging from about 0.09 mm to about 3.5 mm.

In other particular embodiments, the abrasive material is CHRONITAL® stainless steel shot. In these embodiments, the CHRONITAL® stainless steel shot particles have a length ranging from about 0.09 mm to about 3.5 mm.

According to other particular embodiments of the invention, the abrasive blasting is abrasive shotblasting performed by using for example a shot blasting wheels turbine, which propels a stream of high velocity particles, such as metal particles, against the surface to be treated using centrifugal force.

In further particular embodiments, the abrasive blasting is abrasive shotblasting performed using a Turbostrahler® Shotblasting wheels turbine (Konrad Rump, Oberflachentechnik GMBH & Co, Salzkotten, Germany).

In still further particular embodiments, the abrasive blasting is abrasive shotblasting performed using a Turbostrahler® Shotblasting wheels turbine type R320 (Konrad Rump, Oberflachentechnik GMBH & Co, Salzkotten, Germany).

According to certain particular embodiments of the invention, the abrasive blasting is sand blasting performed by using a sand blaster machinery, which propels a stream of high velocity sand sized particles against the surface to be treated using gas under pressure.

In further particular embodiments, the abrasive blasting is sand blasting and the sand sized particles are particles comprising sand.

In still further particular embodiments, the abrasive blasting is sand blasting and the gas under pressure is compressed air.

Figure 13:
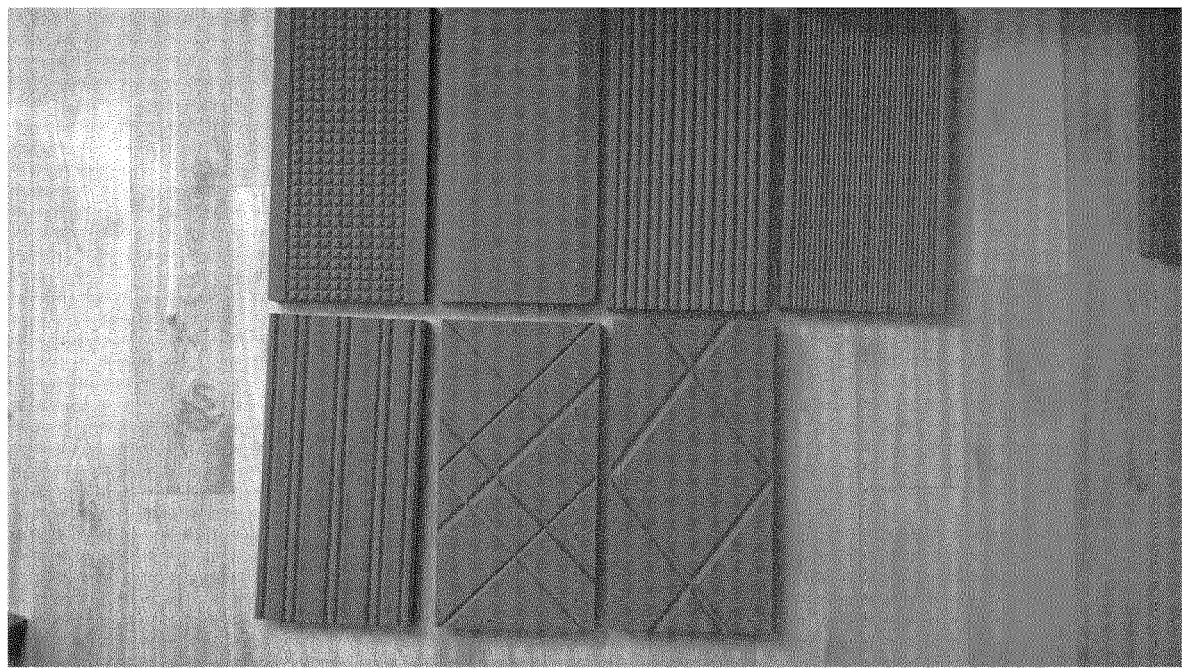
FIG. 13 show fiber cement decking products with an engraved surface decorative pattern according to the present invention.

In other particular embodiments, the methods of the present invention comprise the step of engraving a decorative pattern in the surface of the fiber cement decking products. Methods for engraving a pattern, i.e. incising a design, into a hard, usually flat surface by cutting grooves into it, are known in the art. In particular embodiments, the decorative pattern is a structured wood-like pattern. The result is a patterned fiber cement decking product according to the present invention for instance as shown in FIG. 13.

In other certain particular embodiments, the methods of the present invention comprise the step of embossing a decorative pattern in the surface of the fiber cement decking products. The step of embossing a decorative pattern in a fiber cement product of the present invention is done prior to the step of curing the product and can be performed by methods known in the art. Accordingly, when the green fiber cement product is formed and is still wet, its surface is treated by pressing a template or a mold, such as but not limited to a metal template or a metal mold, into the wet surface of the green fiber cement product. The result is a patterned fiber cement decking product according to the present invention, which can then be cured and hardened. In particular embodiments, the decorative pattern is a structured wood-like pattern. Examples of embossed fiber cement decking products according to the present invention are shown in FIGS. 6 to 10.

In a third aspect, the present invention provides mass-coloured fiber cement decking products obtainable by any of the methods as disclosed by the present invention.

In a fourth aspect, the present invention provides uses of mass-coloured fiber cement decking products as disclosed herein as building materials, in particular for flooring and decking applications, such as but not limited to outdoor flooring and decking applications, fencing applications and/or covering applications.

The invention will now be further illustrated in detail with reference to the following Examples.

EXAMPLES

It will be appreciated that the following examples, given for purposes of illustration, are not to be construed as limiting the scope of this invention. Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention that is defined in the following claims and all equivalents thereto. Further, it is recognized that many embodiments may be conceived that do not achieve all of the advantages of some embodiments, yet the absence of a particular advantage shall not be construed to necessarily mean that such an embodiment is outside the scope of the present invention.

Figure 2:
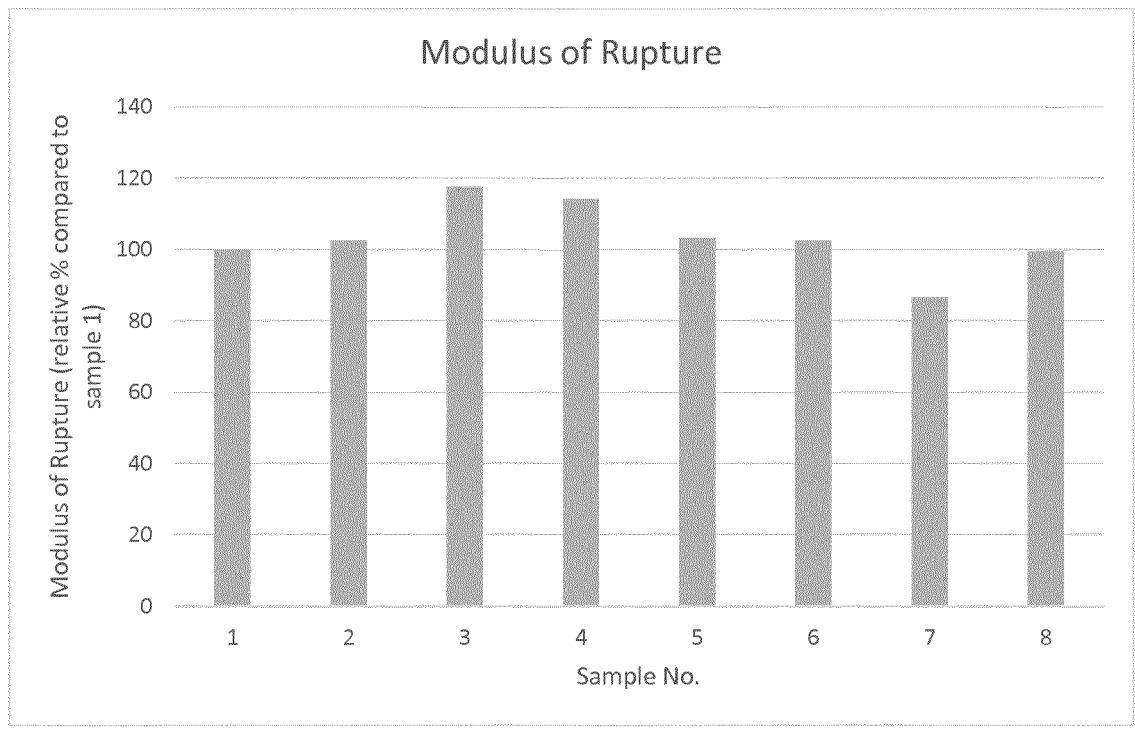
FIG. 2 represents the flexural strength (modulus of rupture; in relative % compared to Sample 1) of fiber cement samples 1 to 8 as produced with the compositions represented in Table 1. Modulus of rupture was measured 29 days after production and air-curing (samples 1 to 6 and 8) or autoclave-curing (sample 7) by making use of a UTS/INSTRON apparatus (type 3345; cel=5000N).
Figure 3:
FIG. 3 represents the flexural strength (modulus of rupture; in relative % compared to Sample 9) of fiber cement samples 9 to 11 as produced with the compositions represented in Table 4. Modulus of rupture was measured 29 days after production and air-curing by making use of a UTS/INSTRON apparatus (type 3345; cel=5000N).

It will become clear from the experimental results as described below that the fiber cement decking products of the present invention are characterized by a high Charpy impact resistance (measured according to standard ISO180 or ASTM D256) even after ageing during exposure to carbon dioxide. In addition, the products according to the present invention were demonstrated to have a high flexural modulus (as shown in FIGS. 1 to 3). As will also become clear from the results described below, these beneficial properties are effectuated by the specific fiber cement composition of the decking products of the present invention as described in detail in the present application.

In addition, the fiber cement decking products of the present invention have an attractive esthetic appearance because of their mass-coloured aspect and their original decorative surface pattern (as shown in FIGS. 4 to 13).

Example 1: Effect of the Fiber Composition on the Mechanical Properties of the Fiber Cement Decking Products According to the Present Invention Fiber cement products were produced with the methods of the present invention as described herein according to the following specific embodiments.

1.1 Materials & Methods
1.1.1 Production of Fiber Cement Slurry Samples

Different formulations of an aqueous fiber cement slurry were prepared as shown in Table 1. Other additives may have been added to these formulations, without being essential to the findings of the present invention.

1.1.2 Manufacture of Fiber Cement Product on Mini-Hatschek Machine

Cementitious products were manufactured by the Hatschek technique according to a pilot process reproducing the main characteristics of the products obtained by the industrial process.

The green sheets of samples 1 to 6 and 8 were pressed at 230 kg/cm$^2$ and air-cured by subjecting them to a curing at 60° C. for 8 hours, and thereafter curing at ambient conditions. Sample 7 was not air-cured but autoclave-cured for a total of 9 hours, at a pressure between 100 to 150 psi and at a temperature of 148 to 177 degrees Celsius.

After two weeks, the formed fiber cement products were analyzed for their physico-mechanical characteristics, i.e. Charpy impact resistance and flexural strength.

1.1.3 Measurement of the Charpy Impact Resistance

The Charpy impact resistance was measured according to standard ASTM D-256-81, using an apparatus Zwick DIN 5102.100/00 on air-dry mini-Hatschek samples of 15 mm*120 mm and a span of 100 mm.

Each of the mini-Hatschek samples were measured in two directions (machine direction and direction perpendicular to this) two weeks after the production.

The impact resistance of the same samples was again measured after ageing in an oven of 600 L at 60° C. and 90% of relative humidity, with injection of 1.5 L $CO_2$/min during 24 hours. The $CO_2$ concentration ranges thus from 7% at the beginning of conditioning to 12% at the end of conditioning.

1.1.4 Measurement of the Flexural Strength

The modulus of rupture (MOR; typically expressed in Pa=kg/m·$s^2$) of each of the mini-Hatschek samples was measured by making use of a UTS/INSTRON apparatus (type 3345; cel=5000N).

1.2 Results 1.2.1 Charpy Impact Resistance of the Fiber Cement Decking Products of the Present Invention Table 2 and FIG. 1 show the results that were obtained with regard to the Charpy impact resistance of fiber cement products produced with the fiber cement compositions of samples 1 to 8 as presented in Table 1 using the methods of the present invention. The results in Table 2 were derived from average values from several sample tests. It was observed that the Charpy impact resistance of the obtained fiber cement products was significantly improved for air-cured samples comprising synthetic fibers (i.e. all samples vs. sample 7, which was an autoclave-cured sample, exclusively containing natural cellulose fibers). Samples 4, 5 and 6, comprising a combination of different types of synthetic fibers, namely a combination of polypropylene fibers combined with polyvinyl alcohol fibers, performed particularly well (see FIG. 1).

TABLE 2

Relative % values for the Charpy impact resistance of fiber cement products obtained according to the methods of the invention

| Sample (see Table 1) | Charpy impact of fiber cement (in relative % compared to Sample 1) |
|---|---|
| 1 | 100.00 |
| 2 | 106.96 |
| 3 | 128.41 |
| 4 | 177.44 |
| 5 | 177.16 |
| 6 | 188.86 |
| 7 | 44.011 |
| 8 | 109.47 |

1.2.2 Flexural Strength

Table 3 and FIG. 2 show the results that were obtained with regard to the mechanical strength of fiber cement products produced with the fiber cement compositions of samples 1 to 8 as presented in Table 1 using the methods of the present invention. The results in Table 3 were derived from average values from several sample tests. It was observed that the modulus of rupture of the obtained fiber cement products was significantly improved for air-cured samples comprising synthetic fibers (i.e. all samples vs. sample 7, which was an autoclave-cured sample, exclusively containing natural cellulose fibers). Samples 4, 5 and 6, comprising a combination of different types of synthetic

TABLE 1

FC formulations M % samples 1 to 8 (PVA: polyvinyl alcohol; PP: polypropylene; pigment black iron oxide: Omnixon M21320; pigment brown iron oxide: Omnixon EB 31683; ATH: aluminiumtrihydroxide). M % refers to the mass of the component over the total mass of all components except free water, i.e. the dry matter.

| Ingredient (in M %) | Sample 1 | Sample 2 | Sample 3 | Sample 4 | Sample 5 | Sample 6 | Sample 7 | Sample 8 |
|---|---|---|---|---|---|---|---|---|
| Cement | 79.40 | 79.40 | 79.30 | 78.80 | 78.80 | 80.70 | 29.50 | 79.40 |
| Trass (filler) | 5.00 | 5.00 | 5.00 | 5.00 | 5.00 | 5.00 | 0.00 | 5.00 |
| Black iron oxide | 6.75 | 6.75 | 6.75 | 6.75 | 6.75 | 6.75 | 3.38 | 6.75 |
| Brown iron oxide | 2.25 | 2.25 | 2.25 | 2.25 | 2.25 | 2.25 | 1.12 | 2.25 |
| Cellulose fibers | 2.80 | 2.80 | 2.80 | 2.80 | 2.80 | 2.80 | 7.35 | 2.80 |
| *Low strength PVA fibers 2 dtex | 1.90 | 0.00 | 0.00 | 0.00 | 0.00 | 0.00 | 0.00 | 1.90 |
| **High strength PVA fibers 2 dtex | 0.00 | 1.90 | 1.00 | 1.00 | 0.50 | 0.50 | 0.00 | 0.00 |
| PVA fibers 7 dtex | 0.00 | 0.00 | 1.00 | 1.00 | 1.00 | 1.00 | 0.00 | 0.00 |
| PP fibers | 0.00 | 0.00 | 0.00 | 0.50 | 1.00 | 1.00 | 0.00 | 0.00 |
| Quartz | 0.00 | 0.00 | 0.00 | 0.00 | 0.00 | 0.00 | 37.25 | 0.00 |
| Kaolin | 0.00 | 0.00 | 0.00 | 0.00 | 0.00 | 0.00 | 3.90 | 0.00 |
| ATH | 0.00 | 0.00 | 0.00 | 0.00 | 0.00 | 0.00 | 3.90 | 0.00 |
| Limestone | 0.00 | 0.00 | 0.00 | 0.00 | 0.00 | 0.00 | 7.80 | 0.00 |
| Wollastonite | 0.00 | 0.00 | 0.00 | 0.00 | 0.00 | 0.00 | 5.80 | 0.00 |
| Additives | 1.90 | 1.90 | 1.90 | 1.90 | 1.90 | 0.00 | 0.00 | 1.90 |

*Tenacity of low strength PVA fibers of 2 dtex = 11 to 13 cN/dtex

**Tenacity of high strength PVA fibers of 2 dtex = 13 to 15 cN/dtex fibers, namely a combination of polypropylene fibers combined with polyvinyl alcohol fibers, performed particularly well (see FIG. 2).

TABLE 3

Relative % values for the modulus of rupture of fiber cement products obtained according to the methods of the invention

| Sample (see Table 1) | sMOR (relative % compared to sample 1) (measured under saturated conditions) |
|---|---|
| 1 | 100.00 |
| 2 | 102.61 |
| 3 | 117.69 |
| 4 | 114.26 |
| 5 | 103.33 |
| 6 | 102.66 |
| 7 | 86.68 |
| 8 | 99.64 |

1.3 Conclusion

To conclude, it is clear that fiber cement products manufactured according to the present invention show improved mechanical properties. In particular, air-cured fiber cement products comprising synthetic fibers show a very good impact resistance and a high flexural strength when compared to autoclave-cured products not containing any synthetic fibers.

Example 2: Effect of Amorphous Silica on the Mechanical Properties of the Fiber Cement Decking Products According to the Present Invention Fiber cement products were produced with the methods of the present invention as described herein according to the following specific embodiments.

2.1 Materials & Methods 2.1.1 Production of Fiber Cement Slurry Samples

Different formulations of an aqueous fiber cement slurry were prepared as shown in Table 4. Other additives may have been added to these formulations, without being essential to the findings of the present invention.

TABLE 4

FC formulations M % samples 9 to 11 (PVA: polyvinyl alcohol; pigment black iron oxide: Omnixon M21320; pigment brown iron oxide: Omnixon EB 31683). M % refers to the mass of the component over the total mass of all components except free water, i.e. the dry matter.

| Ingredient (in M %) | Sample 9 | Sample 10 | Sample 11 |
|---|---|---|---|
| Cement | 83.90 | 84.90 | 81.90 |
| Trass (filler) | 5.00 | 0.00 | 0.00 |
| Black iron oxide | 3.38 | 3.38 | 3.38 |
| Brown iron oxide | 1.13 | 1.13 | 1.13 |
| Cellulose fibers | 2.80 | 2.80 | 2.80 |
| *Low strength PVA fibers 2 dtex | 1.90 | 1.90 | 1.90 |
| Amorphous silica | 0.00 | 4.00 | 7.00 |
| Additives | 1.89 | 1.89 | 1.89 |

*Tenacity of low strength PVA fibers of 2 dtex = 11 to 13 cN/dtex 2.1.2 Manufacture of Fiber Cement Product on Mini-Hatschek Machine Cementitious products were manufactured by the Hatschek technique according to a pilot process reproducing the main characteristics of the products obtained by the industrial process.

The green sheets of samples 9 to 11 were pressed at 230 kg/cm² and air-cured by subjecting them to a curing at 60° C. for 8 hours, and thereafter curing at ambient conditions. After two weeks, the formed fiber cement products were analyzed for their physico-mechanical characteristics.

2.1.4 Measurement of the Flexural Strength

The modulus of rupture (MOR; typically expressed in Pa=kg/m·s²) of each of the mini-Hatschek samples was measured by making use of a UTS/INSTRON apparatus (type 3345; cel=5000N).

2.2 Results 2.2.1 Flexural Strength

Table 5 and FIG. 3 show the results that were obtained with regard to the mechanical strength of fiber cement products produced with the fiber cement compositions of samples 9 to 11 as presented in Table 4 using the methods of the present invention. The results in Table 5 represent average values from several sample tests. It was observed that the modulus of rupture of the obtained fiber cement products was significantly improved for air-cured samples comprising amorphous silica, in particular in amounts between about 4 weight % and about 7 weight % (weight % compared to the total dry weight of the fiber cement composition).

TABLE 5

Modulus of rupture (relative % compared to sample 9) of fiber cement products obtained according to the methods of the invention

| Sample (see Table 4) | sMOR (relative % compared to sample 9) (measured under saturated conditions) |
|---|---|
| 9 | 100.00 |
| 10 | 114.38 |
| 11 | 126.14 |

2.3 Conclusion

The above results showed that the fiber cement products manufactured according to the present invention show improved mechanical properties. In particular, air-cured fiber cement products comprising amorphous silica show a higher flexural strength when compared to products not containing amorphous silica. In particular, products comprising amounts between about 4 weight % and about 7 weight % of amorphous silica perform very well.

Example 3: Effect of Amorphous Silica on the Freeze-Thaw Stability of the Fiber Cement Decking Products According to the Present Invention Fiber cement products were produced with the methods of the present invention as described herein according to the following specific embodiments.

3.1 Materials & Methods 3.1.1 Production of Fiber Cement Slurry Samples

Different formulations of an aqueous fiber cement slurry were prepared as shown in Table 6. Other additives may have been added to these formulations, however without being essential to the findings of the present invention.

3.1.2 Manufacture of Fiber Cement Product on Mini-Hatschek Machine

Cementitious products were manufactured by the Hatschek technique according to a pilot process reproducing the main characteristics of the products obtained by the industrial process.

The green sheets of samples 12 to 15 were pressed at 230 kg/cm' and air-cured by subjecting them to a curing at 60°

C. for 8 hours, and thereafter curing at ambient conditions. Sample 16 was not air-cured but autoclave-cured for a total of 9 hours, at a pressure between 100 to 150 psi and at a temperature of 148 to 177 degrees Celsius.

After two weeks, the formed fiber cement products were analyzed for their dimensional stability, i.e. by performing freeze-thaw tests as described below.

3.1.3 Measurement of the Dimensional Stability by Means of Freeze-Thaw Testing

The dimensional stability of samples 12 to 16 was determined using the following procedure. Pre-conditioning of the samples was done before performing the freeze thaw tests. To this end, samples of 100 mm×280 mm (sawed edges) were immersed in water during 3 days. Then, the thickness of the samples was measured and corresponded to the measurement after 0 cycles (reference thickness). Afterwards, samples were subjected to max. 300 freeze-thaw cycles. During the freeze thaw cycles, the samples were maintained alternatingly at −20° C.±3° C. (freeze temperature in a freezer having a temperature of about −20° C.) and at +20° C.±3° C. (thaw temperature of a tray with water in which the samples were immersed) each time for a period of at least 1 hour. During cycling, the temperature in the freezer and in the copper trays was logged. After each 10 to 30 cycles the thickness of the samples was measured and checked for possible defects.

TABLE 6

FC formulations M % samples 12 to 16 (PVA: polyvinyl alcohol; PP: polypropylene; pigment black iron oxide: Omnixon M21320; pigment brown iron oxide: Omnixon EB 31683; ATH: aluminiumtrihydroxide). M % refers to the mass of the component over the total mass of all components except free water, i.e. the dry matter.

| Ingredient (in M %) | Sample 12 | Sample 13 | Sample 14 | Sample 15 | Sample 16 |
| --- | --- | --- | --- | --- | --- |
| Cement | 83.90 | 76.90 | 74.90 | 78.80 | 29.50 |
| Trass (filler) | 5.00 | 5.00 | 0.00 | 5.00 | 0.00 |
| Black iron oxide | 3.38 | 3.38 | 3.38 | 6.75 | 3.38 |
| Brown iron oxide | 1.12 | 1.12 | 1.12 | 2.25 | 1.12 |
| Cellulose fibers | 2.80 | 2.80 | 2.80 | 2.80 | 7.35 |
| *Low strength PVA fibers 2 dtex | 1.90 | 1.90 | 1.90 | 0.00 | 0.00 |
| **High strength PVA fibers 2 dtex | 0.00 | 0.00 | 0.00 | 1.00 | 0.00 |
| PVA fibers 7 dtex | 0.00 | 0.00 | 0.00 | 1.00 | 0.00 |
| PP fibers | 0.00 | 0.00 | 0.00 | 0.50 | 0.00 |
| Quartz | 0.00 | 0.00 | 0.00 | 0.00 | 37.25 |
| Kaolin | 0.00 | 0.00 | 0.00 | 0.00 | 3.90 |
| ATH | 0.00 | 0.00 | 0.00 | 0.00 | 3.90 |
| Limestone | 0.00 | 0.00 | 7.00 | 0.00 | 7.80 |
| Wollastonite | 0.00 | 0.00 | 0.00 | 0.00 | 5.80 |
| Amorphous silica | 0.00 | 7.00 | 7.00 | 0.00 | 0.00 |
| Additives | 1.90 | 1.90 | 1.90 | 1.90 | 0.00 |

*Tenacity of low strength PVA fibers of 2 dtex = 11 to 13 cN/dtex

**Tenacity of high strength PVA fibers of 2 dtex = 13 to 15 cN/dtex 3.2 Results 3.2.1 Dimensional Stability of the Fiber Cement Decking Products of the Present Invention Table 7 shows the results that were obtained with regard to the dimensional stability of fiber cement products produced with the fiber cement compositions of samples 12 to 16 as presented in Table 6 using the methods of the present invention. The results in Table 7 were derived from average values from several sample tests. It was observed that the dimensional stability of the obtained fiber cement products was significantly improved for air-cured samples comprising amorphous silica. Indeed, it is clear from Table 7 that samples 13 and 14 (comprising 7% of amorphous silica) only show a very small increase in thickness after 192 freeze-thaw cycles when compared to the other samples not containing any amorphous silica. It is noted that the autoclave-cured samples were completely disintegrated after 138 freeze-thaw cycles and thus further measurements could not be done.

TABLE 7

Dimensional changes of the fiber cement decking samples 12 to 16, expressed in increase of thickness in % values

| Sample (see Table 6) | Thickness increase (in %) after x cycles | | | | | | | |
|---|---|---|---|---|---|---|---|---|
| | x = 0 | x = 14 | x = 28 | x = 57 | x = 84 | x = 112 | x = 138 | x = 167 | x = 192 |
| 12 | 0.00 | 0.15 | 0.30 | 0.39 | 0.67 | 1.44 | 2.43 | 3.61 | 4.69 |
| 13 | 0.00 | 0.19 | 0.38 | 0.34 | 0.31 | 0.37 | 0.43 | 0.58 | 0.41 |
| 14 | 0.00 | 0.25 | 0.43 | 0.41 | 0.35 | 0.43 | 0.50 | 0.60 | 0.63 |
| 15 | 0.00 | 0.13 | 0.09 | 0.17 | 0.17 | 1.38 | 1.98 | 2.62 | 3.14 |
| 16 | 0.00 | 0.26 | 0.55 | 2.68 | 4.11 | 6.01 | 7.41 | No value | No value |

3.3 Conclusion

To conclude, the fiber cement products manufactured according to the present invention show improved mechanical properties. In particular, air-cured fiber cement products comprising about 7% of amorphous silica show a very good dimensional stability when compared to samples not containing amorphous silica.

Example 4: Effect of the Fiber Composition on the Charpy Impact Resistance of the Fiber Cement Decking Products According to the Present Invention Fiber cement products were produced with the methods of the present invention as described herein according to the following specific embodiments.

4.1 Materials & Methods
4.1.1 Production of Fiber Cement Slurry Samples

Different formulations of an aqueous fiber cement slurry were prepared as shown in Tables 8 and 9. Other additives may have been added to these formulations, however without being essential to the findings of the present invention.

TABLE 8

FC formulations M % samples 17 to 23 (PVA: polyvinyl alcohol; PP: polypropylene; pigment black iron oxide: Omnixon M21320; pigment brown iron oxide: Omnixon EB 31683; ATH: aluminiumtrihydroxide). M % refers to the mass of the component over the total mass of all components except free water, i.e. the dry matter.

| Ingredient (in M %) | Sample 17 | Sample 18 | Sample 19 | Sample 20 | Sample 21 | Sample 22 | Sample 23 |
|---|---|---|---|---|---|---|---|
| Cement | 79.40 | 79.30 | 78.80 | 29.50 | 81.30 | 81.75 | 81.75 |
| Trass (filler) | 5.00 | 5.00 | 5.00 | 0.00 | 0.00 | 0.00 | 0.00 |
| Black iron oxide | 6.75 | 6.75 | 6.75 | 3.38 | 3.38 | 3.38 | 3.38 |
| Brown iron oxide | 2.25 | 2.25 | 2.25 | 1.12 | 1.12 | 1.12 | 1.12 |
| Cellulose fibers | 2.80 | 2.80 | 2.80 | 7.35 | 2.80 | 2.80 | 2.80 |
| *Low strength PVA fibers 2 dtex | 1.90 | 0.00 | 0.00 | 0.00 | 0.00 | 0.00 | 0.00 |
| **High strength PVA fibers 2 dtex | 0.00 | 1.00 | 1.00 | 0.00 | 1.00 | 0.00 | 0.00 |
| PVA fibers 4 dtex | 0.00 | 0.00 | 0.00 | 0.00 | 0.00 | 1.00 | 2.50 |
| PVA fibers 7 dtex | 0.00 | 1.00 | 1.00 | 0.00 | 1.00 | 1.50 | 0.00 |
| PP fibers | 0.00 | 0.00 | 0.50 | 0.00 | 0.50 | 0.50 | 0.50 |
| Quartz | 0.00 | 0.00 | 0.00 | 37.25 | 0.00 | 0.00 | 0.00 |
| Kaolin | 0.00 | 0.00 | 0.00 | 3.90 | 0.00 | 0.00 | 0.00 |

TABLE 8-continued

FC formulations M % samples 17 to 23 (PVA: polyvinyl alcohol; PP: polypropylene; pigment black iron oxide: Omnixon M21320; pigment brown iron oxide: Omnixon EB 31683; ATH: aluminiumtrihydroxide). M % refers to the mass of the component over the total mass of all components except free water, i.e. the dry matter.

| Ingredient (in M %) | Sample 17 | Sample 18 | Sample 19 | Sample 20 | Sample 21 | Sample 22 | Sample 23 |
|---|---|---|---|---|---|---|---|
| ATH | 0.00 | 0.00 | 0.00 | 3.90 | 0.00 | 0.00 | 0.00 |
| Limestone | 0.00 | 0.00 | 0.00 | 7.80 | 0.00 | 0.00 | 0.00 |
| Wollastonite | 0.00 | 0.00 | 0.00 | 5.80 | 0.00 | 0.00 | 0.00 |
| Amorphous silica | 0.00 | 0.00 | 0.00 | 0.00 | 7.00 | 7.00 | 7.00 |
| Additives | 1.90 | 1.90 | 1.90 | 0.00 | 1.90 | 0.95 | 0.95 |

*Tenacity of low strength PVA fibers of 2 dtex = 11 to 13 cN/dtex
**Tenacity of high strength PVA fibers of 2 dtex = 13 to 15 cN/dtex

4.1.2 Manufacture of Fiber Cement Product on Mini-Hatschek Machine

Cementitious products were manufactured by the Hatschek technique according to a pilot process reproducing the main characteristics of the products obtained by the industrial process.

The green sheets of samples 17 to 23 were pressed at 230 kg/cm$^2$ and air-cured by subjecting them to a curing at 60° C. for 8 hours, and thereafter curing at ambient conditions. Sample 20 was not air-cured but autoclave-cured for a total of 9 hours, at a pressure between 100 to 150 psi and at a temperature of 148 to 177 degrees Celsius (see Table 8).

After two weeks, the formed fiber cement products were analyzed for their Charpy impact resistance.

4.1.3 Manufacture of Fiber Cement Product on an Industrial Hatschek Machine Cementitious products were manufactured by an industrial Hatschek process. The green sheets of samples 24 and 25 were pressed at 230 kg/cm$^2$ and air-cured by subjecting them to a curing at 60° C. for 8 hours, and thereafter curing at ambient conditions (see Table 9). After two weeks, the formed fiber cement products were analyzed for their Charpy impact resistance.

TABLE 9

FC formulations M % samples 24 and 25 (PVA: polyvinyl alcohol; PP: polypropylene; pigment black iron oxide: Omnixon M21320; pigment brown iron oxide: Omnixon EB 31683; ATH: aluminiumtrihydroxide). M % refers to the mass of the component over the total mass of all components except free water, i.e. the dry matter.

| Ingredient (in M %) | Sample 24 | Sample 25 |
|---|---|---|
| Cement | 83.90 | 81.29 |
| Trass (filler) | 5.00 | 0.00 |
| Black iron oxide | 3.38 | 3.38 |
| Brown iron oxide | 1.12 | 1.12 |
| Cellulose fibers | 2.80 | 2.80 |
| *Low strength PVA fibers 2 dtex | 1.90 | 0.00 |
| **High strength PVA fibers 2 dtex | 0.00 | 1.00 |
| PVA fibers 7 dtex | 0.00 | 1.00 |
| PP fibers | 0.00 | 0.50 |
| Quartz | 0.00 | 0.00 |
| Kaolin | 0.00 | 0.00 |
| ATH | 0.00 | 0.00 |
| Limestone | 0.00 | 0.00 |
| Wollastonite | 0.00 | 0.00 |
| Amorphous silica | 0.00 | 0.00 |
| Additives | 1.90 | 1.90 |

*Tenacity of low strength PVA fibers of 2 dtex = 11 to 13 cN/dtex
**Tenacity of high strength PVA fibers of 2 dtex = 13 to 15 cN/dtex

4.2 Results

4.2.1 Measurement of the Charpy Impact Resistance

The Charpy impact resistance was measured according to standard ASTM D-256-81, using an apparatus Zwick DIN 5102.100/00 on air-dry mini-Hatschek samples of 15 mm*120 mm and a span of 100 mm.

Each of the samples 17 to 25 were measured in two directions (machine direction and direction perpendicular to this) two weeks after the production.

The impact resistance of the same samples was again measured after ageing in an oven of 600 L at 60° C. and 90% of relative humidity, with injection of 1.5 L $CO_2$/min during 24 hours. The $CO_2$ concentration ranges thus from 7% at the beginning of conditioning to 12% at the end of conditioning.

4.2.2 Charpy Impact Resistance of the Fiber Cement Decking Products of the Present Invention Table 10 shows the results that were obtained with regard to the Charpy impact resistance of fiber cement products produced with the fiber cement compositions of samples 17 to 25 as presented in Tables 8 and 9 using the methods of the present invention. The results in Table 10 were derived from average values from several sample tests. It was observed that the Charpy impact resistance of the obtained fiber cement products was significantly improved for air-cured samples comprising synthetic fibers (i.e. all samples vs. sample 20, which was an autoclave-cured sample, which exclusively contained natural cellulose fibers). Samples 18, 19, 21, 22 and 23, each of which comprised a combination of different types of synthetic fibers performed particularly well when compared for instance to sample 17, containing only one type of synthetic fibers. Finally, the specific combination of one or more types of polyvinyl alcohol (PVA) fibers with polypropylene (PP) fibers resulted in fiber cement products with a particularly high impact resistance. This is clear from the mini-hatschek trials when comparing sample 19 and samples 21 to 23 (comprising PVA and PP fibers) to for instance sample 17 (only containing PVA fibers). The same is true for the samples obtained from the industrial trials, where sample 25 (comprising a combination of PVA and PP fibers) clearly has a significantly improved impact resistance over sample 24 (only comprising PVA fibers).

TABLE 10

Charpy impact resistances (in kJ/m$^2$) of fiber cement products obtained according to the methods of the invention

| Sample (see Tables 8 and 9) | Charpy impact of fiber cement (in kJ/m$^2$)) |
| --- | --- |
| 17 | 3.12 |
| 18 | 3.44 |
| 19 | 5.44 |
| 20 | 1.58 |
| 21 | 5.68 |
| 22 | 6.66 |
| 23 | 8.57 |
| 24 | 4.20 |
| 25 | 7.63 |

4.3 Conclusion

To conclude, it is clear that fiber cement products manufactured according to the present invention show substantially improved mechanical properties as compared to known fiber cement products. In particular, air-cured fiber cement products comprising synthetic fibers show a very good impact resistance. In addition, air-cured fiber cement products comprising a combination of different types of synthetic fibers, especially a combination of polyvinyl alcohol fibers and polypropylene fibers perform best.

The invention claimed is:

1. An air-cured, mass-coloured fiber cement decking product having a thickness between 15 mm and 25 mm, and formed from a fiber cement composition which comprises
at least one pigment selected from the group consisting of brown iron oxide, black iron oxide and white titanium oxide,
2 weight % to 5 weight % of cellulose fibers compared to the total dry weight of the fiber cement composition,
75 to 90 weight % Portland cement as hydraulic binder compared to the total dry weight of the fiber cement composition,
at least one type of synthetic fiber comprising polyvinyl alcohol fiber, and
amorphous silica in an amount of about 4 weight % to about 9 weight % compared to the total dry weight of the fiber cement composition, wherein
the synthetic fiber is present in an amount of 1.0 to 3.5 weight % compared to the total dry weight of the fiber cement composition,
said at least one pigment is present in a total amount of about 3 weight % to about 5 weight % compared to the total dry weight of the fiber cement composition, and
the fiber cement decking product is compressed at a pressure of 22 MPa to 30 MPa prior to curing.

2. The air-cured mass-coloured fiber cement decking product according to claim 1, wherein the synthetic fiber is present in an amount of 2.5 to 3.5 weight % compared to the total dry weight of the fiber cement composition.

3. The air-cured mass-coloured fiber cement decking product according to claim 1, wherein said cement layers are Hatschek fiber cement layers.

4. The air-cured mass-coloured fiber cement decking product according to claim 1, having a thickness between 20 and 25 mm.

5. The air-cured mass-coloured fiber cement decking product according to claim 1, wherein the fiber cement decking product comprises a plurality of fiber cement layers.

6. The air-cured mass-coloured fiber cement decking product according to claim 1, wherein the fiber cement decking product has an abrasively blasted surface.

7. The air-cured mass-coloured fiber cement decking product according to claim 1, wherein the fiber cement decking product has an engraved surface pattern or an embossed surface pattern.

8. The air-cured mass-coloured fiber cement decking product according to claim 1, wherein the pigments have particle size of 0.2 to 0.4 microns in diameter.

9. The air-cured mass-coloured fiber cement decking product according to claim 1, wherein the amorphous silica is silica fume.

* * * * *